US012659944B2

(12) United States Patent
Fan

(10) Patent No.: US 12,659,944 B2
(45) Date of Patent: Jun. 16, 2026

(54) DATA TRANSMISSION METHOD, APPARATUS, AND SYSTEM

(71) Applicant: Huawei Technologies Co., Ltd., Shenzhen (CN)

(72) Inventor: Qiang Fan, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 341 days.

(21) Appl. No.: 18/344,354

(22) Filed: Jun. 29, 2023

(65) Prior Publication Data

US 2023/0345449 A1 Oct. 26, 2023

Related U.S. Application Data

(63) Continuation of application No. PCT/CN2020/142280, filed on Dec. 31, 2020.

(51) Int. Cl.
*H04W 72/12* (2023.01)
*H04W 72/54* (2023.01)

(52) U.S. Cl.
CPC ........... *H04W 72/12* (2013.01); *H04W 72/54* (2023.01)

(58) Field of Classification Search
CPC . H04W 72/12; H04W 72/04; H04W 72/0413; H04W 72/1278; H04W 72/1284;
(Continued)

(56) References Cited

U.S. PATENT DOCUMENTS

2018/0367288 A1* 12/2018 Vrzic .................... H04W 76/12
2019/0132228 A1* 5/2019 Tang ..................... H04L 5/0055
(Continued)

FOREIGN PATENT DOCUMENTS

CN 106304377 A 1/2017
CN 109246648 A 1/2019

OTHER PUBLICATIONS

Jens Gebert et al, "Alternating Transmission of Packets in Dual Connectivity for Periodic Deterministic Communication Utilising Survival Time," 2020 European Conference on Networks and Communications (EuCNC): Vertical Applications and Internet of Things (VAP), Jun. 15-18, 2020, total 5 pages.
(Continued)

*Primary Examiner* — Mohamed A Kamara
(74) *Attorney, Agent, or Firm* — Slater Matsil, LLP

(57) ABSTRACT

Embodiments of this application provide a data transmission method, an apparatus, and a system. The method includes: obtaining a transmission pattern combination of data including at least two data packets, where the transmission pattern combination includes at least two transmission patterns, and the transmission pattern indicates a transmission manner and/or a processing manner of the data packet; and transmitting the data based on the transmission pattern combination, where the transmission pattern is determined for each data packet in correspondence to a matching condition, and the matching condition is associated with feature information of the data packet. According to the foregoing method, a manner in which a data packet is processed and transmitted can be accurately controlled, so that data packets with different features are processed and transmitted by using appropriate transmission parameters, to ensure service transmission reliability and implement effective resource utilization.

20 Claims, 4 Drawing Sheets

(58) Field of Classification Search
CPC . H04W 72/54; H04W 28/18; H04W 28/0278;
H04W 28/0268; H04W 72/569; H04L
47/34
See application file for complete search history.

(56) References Cited

U.S. PATENT DOCUMENTS

| 2020/0382993 A1* | 12/2020 | Zhao ..................... H04L 5/001 |
| 2020/0389915 A1* | 12/2020 | Sundararajan .... H04W 72/1268 |
| 2021/0329620 A1* | 10/2021 | Kanamarlapudi .... H04L 5/0091 |
| 2022/0103293 A1* | 3/2022 | Moilanen .................. H04L 1/08 |
| 2022/0321249 A1* | 10/2022 | Fu ..................... H04W 28/0252 |

OTHER PUBLICATIONS

Nokia, Nokia Shanghai Bell, "Enhanced Industrial Internet of Things (IoT) and ultra-reliable and low latency communication (URLLC) support for NR," 3GPP TSG RAN Meeting #88e, Electronic meeting, Jun. 29-Jul. 3, 2020, RP-201310, total 6 pages.

* cited by examiner

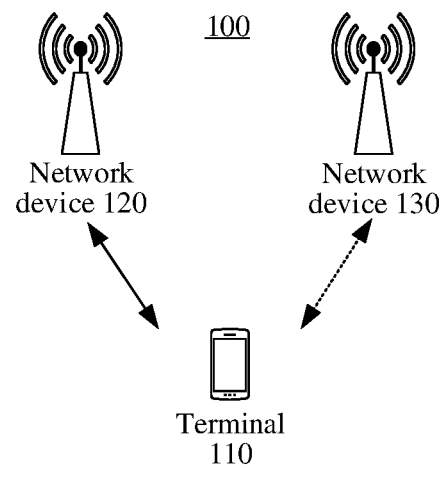

100

Network device 120

Network device 130

Terminal 110

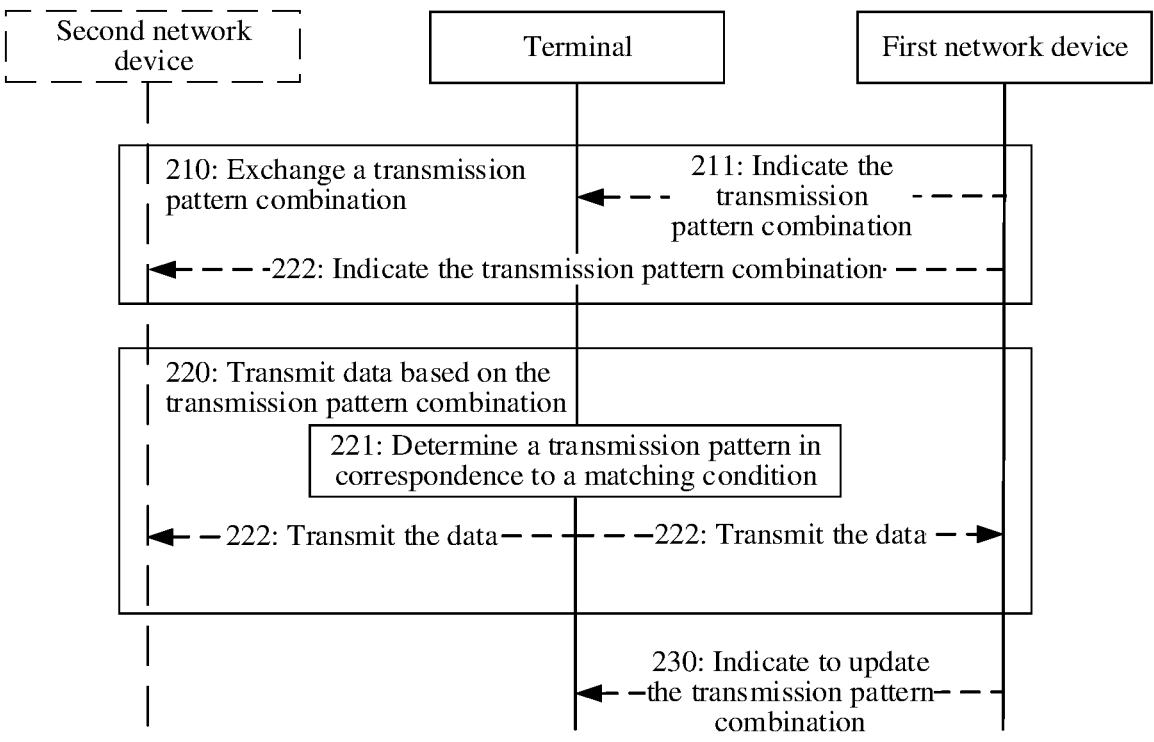

| Second network device | Terminal | First network device |

210: Exchange a transmission pattern combination

211: Indicate the transmission pattern combination

222: Indicate the transmission pattern combination

220: Transmit data based on the transmission pattern combination

221: Determine a transmission pattern in correspondence to a matching condition

222: Transmit the data — — — — 222: Transmit the data

230: Indicate to update the transmission pattern combination

DATA TRANSMISSION METHOD, APPARATUS, AND SYSTEM

CROSS-REFERENCE TO RELATED APPLICATIONS

This application is a continuation of International Application No. PCT/CN2020/142280, filed on Dec. 31, 2020, the disclosure of which is hereby incorporated by reference in its entirety.

TECHNICAL FIELD

Embodiments of this application relate to the field of communication technologies, and in particular, to a data transmission method, an apparatus, and a system.

BACKGROUND

With development of wireless communication technologies, to improve communication experience, a communication system can support coexistence of a plurality of service types, for example, an ultra-reliable and low-latency communication (URLLC) service, an enhanced mobile broadband (eMBB) service, and a massive machine type communication (mMTC) service. Therefore, transmission requirements of data associated with the services are diversified, and a requirement on data transmission control precision is high.

For example, in some scenarios, to ensure data transmission reliability, some services of great importance may be transmitted through duplication transmission. In some scenarios, to improve a throughput of a terminal, the terminal may be simultaneously connected to two network devices for data transmission. Therefore, how to implement refined control on data transmission is an urgent problem to be resolved.

SUMMARY

Embodiments of this application provides a data transmission method, an apparatus, and a system, to implement refined control on data transmission, so as to ensure data transmission reliability and improve resource utilization.

According to a first aspect, an embodiment of this application provides a data transmission method. The method may be performed by a terminal, or may be performed by a component (for example, a processor, a chip, or a chip system) of the terminal, and includes: obtaining a transmission pattern combination of data including at least two data packets, where the transmission pattern combination includes at least two transmission patterns, and the transmission pattern indicates a transmission manner and/or a processing manner of the data packet; and transmitting the data based on the transmission pattern combination, where the transmission pattern is determined for each data packet in correspondence to a matching condition, and the matching condition is associated with feature information of the data packet.

In the foregoing method, the transmission pattern combination is obtained, so that a manner in which the data packet is processed and transmitted can be accurately controlled, and data packets with different features are processed and transmitted by using appropriate transmission parameters, to ensure data transmission reliability and implement effective resource utilization.

Optionally, the obtaining a transmission pattern combination includes: receiving, from a first network device, first indication information indicating the transmission pattern combination. Optionally, the first indication information is radio resource control (RRC) signaling, media access control control element (MAC CE), physical layer control signaling, or the like.

Optionally, the receiving, from a first network device, first indication information indicating the transmission pattern combination includes: receiving, from the first network device, the first indication information indicating an index of each transmission pattern in the transmission pattern combination.

The transmission pattern combination is exchanged with the first network device by using a message, to obtain the transmission pattern.

In a possible manner, the first indication information further indicates the matching condition. Optionally, the transmission pattern includes a transmission parameter and a matching condition parameter, and the matching condition parameter indicates the matching condition.

In this manner, both the transmission pattern combination and the matching condition are indicated by using the first indication information. This helps determine the matching condition corresponding to the transmission pattern in the transmission pattern combination.

In a possible manner, indication information indicating the matching condition is received from the first network device.

In this manner, the matching condition is received. This helps determine the transmission pattern based on the matching condition, so that data packets with different features are processed and transmitted by using appropriate transmission parameters.

Optionally, the feature information of the data packet includes at least one of the following: data packet size information, data packet type information, quality of service QoS parameter information corresponding to the data packet, importance level information corresponding to the data packet, or transmission sequence information of the data packet.

In this manner, the feature information of the data packet is associated with one or more of a data packet size, a type, an importance level, and the transmission sequence information. This helps determine corresponding transmission parameters for the data packet from different dimensions.

Optionally, the transmission pattern includes the transmission parameter, the transmission parameter indicates the transmission manner and/or the processing manner of the data packet, and the transmission manner and/or the processing manner include/includes transmission resource information, transmission path information, and/or reliability processing manner information.

Optionally, the transmission parameter includes at least one parameter of logical channel LCH information, duplication state information, information indicating a quantity of consecutive data packets transmitted in the transmission pattern, logical channel prioritization (LCP) information, data radio bearer (DRB) information, or shared spectrum information.

In this manner, the transmission parameter includes transmission control policies or methods in different dimensions, for example, related to the transmission resource information, the transmission path information, and/or the reliability processing manner information. This helps select a corresponding transmission parameter based on different features of the data packet, so that transmission control is more refined.

In a possible manner, that the transmission pattern is determined for the data packet in correspondence to a matching condition includes: In correspondence to a transmission sequence of the data packets, the transmission patterns are sequentially selected from the transmission combination.

Optionally, that in correspondence to a transmission sequence of the data packets, the transmission patterns are sequentially selected from the transmission combination further includes: Information indicating a reference data packet is received from the first network device, where in correspondence to the reference data packet, the transmission patterns are sequentially selected from the transmission pattern combination.

Optionally, the information about the reference data packet includes a sequence number of a packet data convergence protocol PDCP service data unit SDU corresponding to the reference data packet.

Optionally, that in correspondence to each data packet, the transmission patterns are sequentially selected from the transmission pattern combination according to a transmission sequence of the data packets includes: A quantity that is of consecutive data packets transmitted in each transmission pattern and that is indicated by the first network device is received.

Optionally, that a quantity that is of consecutive data packets transmitted in each transmission pattern and that is indicated by the first network device is received includes: Information about the quantity of consecutive data packets transmitted in the transmission pattern is indicated in the transmission parameter corresponding to the transmission pattern.

In the foregoing manner, a network device configures the transmission pattern combination, and may successively select the transmission patterns in the transmission pattern combination according to the transmission sequence of the data packets, to avoid a problem of continuous packet losses caused by channel fading when a plurality of data packets are transmitted through a same path, so as to ensure service transmission reliability and effective resource utilization.

In a possible manner, the transmission pattern is at a terminal granularity, or at a bearer granularity, or at an entity granularity.

Optionally, the transmission pattern is a transmission pattern corresponding to a DRB, a PDCP entity, a radio link control RLC entity, a QoS flow, a QoS flow identifier QFI, or a service data adaptation protocol SDAP entity of the terminal. Optionally, the terminal obtains the transmission pattern combination by using an information element added to a DRB configuration.

In the foregoing manner, the transmission pattern may be at a terminal granularity, at a bearer granularity, or at an entity granularity. These flexible configuration or indication manners facilitate refined control on data packet transmission.

In a possible manner, activation state information indicating the transmission pattern or second indication information indicating to update the transmission pattern combination is received from the first network device; and an activation state of the transmission pattern is updated or the transmission pattern combination is updated based on the second indication information.

Optionally, an update request message is sent to the first network device, to request to update the transmission pattern combination. Optionally, the update request message includes one or more of a request reason, a recommended transmission pattern, or a recommended transmission parameter.

Optionally, that the transmission pattern combination is updated includes: The transmission pattern used by the terminal is activated/deactivated or switched, or the transmission parameter in the transmission pattern of the terminal is adjusted.

Optionally, the transmission pattern in the transmission pattern combination is activated by default or deactivated by default. Optionally, the transmission pattern in the transmission pattern combination is activated or deactivated by receiving a MAC CE.

Optionally, a default transmission pattern indicated by the network device is received. Optionally, the default transmission pattern is included in the transmission pattern combination. Optionally, the default transmission pattern does not correspond to the matching condition.

In the foregoing manner, the transmission pattern used by the terminal is quickly activated/deactivated or switched, or the transmission parameter in the transmission pattern of the terminal is adjusted, so that a transmission parameter to be used for processing and transmission of the data packet can be quickly and flexibly controlled based on a change of a transmission channel, to improve resource utilization and ensure service transmission reliability.

Optionally, the transmitting the data packet based on the transmission pattern combination includes: selecting, based on the matching condition, the transmission pattern corresponding to the data packet; and transmitting the data packet to the first network device or a second network device in the transmission pattern.

Optionally, the transmitting the data packet based on the transmission pattern combination includes: receiving the data packet from the first network device or a second network device in the transmission pattern.

After the transmission pattern is determined in correspondence to the matching condition, data transmission may be performed with the network device in the transmission pattern, to implement refined control on data transmission.

According to a second aspect, an embodiment of this application provides a data transmission method. The method may be performed by a first network device, or may be performed by a component (for example, a processor, a chip, or a chip system) of the first network device, and includes: sending first indication information to a terminal, where the first indication information indicates a transmission pattern combination of data including at least two data packets, the transmission pattern combination includes at least two transmission patterns, and the transmission pattern indicates a transmission manner and/or a processing manner of the data packet; and transmitting the data based on the transmission pattern combination, where the transmission pattern is determined for each data packet in correspondence to a matching condition, and the matching condition is associated with feature information of the data packet.

In the foregoing method, the first network device indicates the transmission pattern combination to the terminal, so that data transmission is performed between the first network device and the terminal based on the transmission pattern combination, a manner in which the data packet is processed and transmitted can be accurately controlled, and data packets with different features are processed and transmitted by using appropriate transmission parameters, to ensure service transmission reliability and implement effective resource utilization.

Optionally, the sending, to a terminal, first indication information indicating a transmission pattern combination includes: sending, to the terminal, the first indication information indicating an index of each transmission pattern in the transmission pattern combination.

Signaling overheads can be reduced by using an index to indicate the transmission pattern combination. This facilitates energy saving.

In a possible manner, the matching condition is indicated to the terminal.

Optionally, that the matching condition is indicated to the terminal includes: The matching condition is indicated by using the first indication information. Optionally, the transmission pattern includes a transmission parameter and a matching condition parameter, and the matching condition parameter indicates the matching condition.

In the foregoing manner, the matching condition corresponding to the transmission pattern is determined, so that data packets with different features are processed and transmitted in correspondence to different transmission parameters.

Optionally, the feature information of the data packet includes at least one of the following: data packet size information, data packet type information, quality of service QoS parameter information corresponding to the data packet, importance level information corresponding to the data packet, or transmission sequence information of the data packet.

In this manner, the feature information of the data packet is associated with one or more of a data packet size, a type, an importance level, and the transmission sequence information. This helps determine corresponding transmission parameters for the data packet from different dimensions.

Optionally, the transmission pattern includes the transmission parameter, the transmission parameter indicates the transmission manner and/or the processing manner of the data packet, and the transmission manner and/or the processing manner include/includes transmission resource information, transmission path information, and/or reliability processing manner information.

Optionally, the transmission parameter includes at least one parameter of LCH information, duplication state information, information indicating a quantity of consecutive data packets transmitted in the transmission pattern, LCP information, DRB information, or shared spectrum information.

In this manner, the transmission parameter includes transmission control policies or methods in different dimensions, for example, related to the transmission resource information, the transmission path information, and/or the reliability processing manner information. This helps select a corresponding transmission parameter based on different features of the data packet, so that transmission control is more refined.

In a possible manner, that the transmission pattern is determined for the data packet in correspondence to a matching condition includes: In correspondence to a transmission sequence of the data packets, the transmission patterns are sequentially selected from the transmission combination.

Optionally, that in correspondence to a transmission sequence of the data packets, the transmission patterns are sequentially selected from the transmission combination further includes: Information indicating a reference data packet is indicated to the terminal, where in correspondence to the reference data packet, the transmission patterns are sequentially selected from the transmission pattern combination.

Optionally, the information about the reference data packet includes a sequence number of a packet data convergence protocol PDCP service data unit SDU corresponding to the reference data packet.

Optionally, that in correspondence to a transmission sequence of each data packet, the transmission patterns are sequentially selected from the transmission pattern combination includes: A quantity of consecutive data packets transmitted in each transmission pattern is indicated to the terminal.

Optionally, that a quantity of consecutive data packets transmitted in each transmission pattern is indicated to the terminal includes: Information about the quantity of consecutive data packets transmitted in the transmission pattern is indicated in the transmission parameter corresponding to the transmission pattern.

In the foregoing manner, a network device configures the transmission pattern combination, and may successively select the transmission patterns in the transmission pattern combination according to the transmission sequence of the data packets, to avoid a problem of continuous packet losses caused by channel fading when a plurality of data packets are transmitted through a same path, so as to ensure service transmission reliability and effective resource utilization.

In a possible manner, the transmission pattern is a transmission pattern corresponding to a DRB, a PDCP entity, a radio link control RLC entity, a QoS flow, a QoS flow identifier QFI, or a service data adaptation protocol SDAP entity of the terminal. Optionally, the transmission pattern combination is indicated by using an information element added to a DRB configuration. It is easily understood that when granularities corresponding to the transmission patterns are different, transmission parameters included in the transmission patterns may be different, that is, granularities corresponding to the transmission patterns may be adapted to, and the transmission parameters included in the transmission patterns are determined.

In the foregoing manner, the transmission pattern may be at a terminal granularity, at a bearer granularity, or at an entity granularity. These flexible configuration or indication manners facilitate refined control on data packet transmission.

In a possible manner, activation state information indicating the transmission pattern or second indication information indicating to update the transmission pattern combination is sent to the terminal.

Optionally, an update request message requesting to configure or update the transmission pattern combination is received from the terminal. Optionally, the update request message includes one or more of a request reason, a recommended transmission pattern, or a recommended transmission parameter. Optionally, it is determined to update the transmission pattern combination based on the update request message. Optionally, the terminal is indicated to update the transmission pattern combination. Optionally, the terminal is indicated to update the transmission pattern combination based on the transmission pattern recommended by the terminal or the transmission parameter recommended by the terminal.

Optionally, that the transmission pattern combination is updated includes: The transmission pattern used by the terminal is activated/deactivated or switched, or the transmission parameter in the transmission pattern of the terminal is adjusted.

Optionally, the transmission pattern in the transmission pattern combination is activated by default or deactivated by default. Optionally, the first network device sends a MAC CE to the terminal to activate or deactivate the transmission pattern in the transmission pattern combination.

In the foregoing manner, the transmission pattern used by the terminal is quickly activated/deactivated or switched, or the transmission parameter in the transmission pattern of the terminal is adjusted, so that a transmission parameter to be used for processing and transmission of the data packet can be quickly and flexibly controlled based on a change of a transmission channel, to improve resource utilization and ensure service transmission reliability.

In a possible manner, third indication information is sent to a second network device, where the third indication information indicates information associated with a to-be-transmitted data packet between the terminal and the second network device.

Optionally, the information associated with the data packet includes at least one of the following: bitmap information of the data packet, transmission pattern information used by the data packet, transmission parameter information used by the data packet, or arrival time and/or period information of the data packet.

In the foregoing manner, the transmission pattern of the terminal exchanged between the network devices may assist the second network device in resource scheduling, to match transmission of the data packet of the terminal, so as to ensure service reliability and resource utilization.

In a possible manner, the transmitting the data packet based on the transmission pattern combination includes: selecting, based on the matching condition, the transmission pattern corresponding to the data packet; and transmitting the data packet to the terminal in the transmission pattern.

Optionally, the transmitting the data packet based on the transmission pattern combination includes: receiving the data packet from the terminal in the transmission pattern.

After the transmission pattern combination is exchanged between the terminal and the first network device, after the transmission pattern is determined in correspondence to the matching condition, data transmission may be performed with the terminal in the transmission pattern, to implement refined control on data transmission.

According to a third aspect, an embodiment of this application provides a data transmission method. The method may be performed by a second network device, or may be performed by a component (for example, a processor, a chip, or a chip system) of the second network device, and includes: receiving third indication information from a first network device, where the third indication information indicates information associated with a to-be-transmitted data packet between the second network device and a terminal, a transmission pattern is determined for each data packet in correspondence to a matching condition, the transmission pattern indicates a transmission manner and/or a processing manner of the data packet, and the matching condition is associated with feature information of the data packet; and transmitting the data packet based on the third indication information.

According to the foregoing method, the transmission pattern of the terminal exchanged between the network devices may assist the second network device in resource scheduling, to match transmission of the data packet of the terminal, so as to ensure service reliability and resource utilization.

Optionally, the information associated with the data packet includes at least one of the following: bitmap information of the data packet, transmission pattern information used by the data packet, transmission parameter information used by the data packet, or arrival time and/or period information of the data packet.

The transmitting the data packet based on the third indication information includes: performing, based on the third indication information, resource scheduling and/or configuration associated with transmission of the data packet.

In the foregoing manner, information in different dimensions is exchanged. This facilitates resource scheduling by the second network device to match transmission of the data packet.

In a possible design, for definitions or descriptions of related terms, for example, specific content included in the transmission pattern combination, refer to the specific descriptions of the transmission pattern combination in the first aspect or the second aspect. Details are not described herein again.

According to a fourth aspect, an embodiment of this application provides a communication apparatus. The apparatus may be a terminal, or may be a chip used for the terminal. In a possible design, the apparatus has a function of implementing the method according to the first aspect or each possible implementation of the first aspect. The function may be implemented by hardware, or may be implemented by hardware by executing corresponding software. The hardware or the software includes one or more modules corresponding to the function. In a possible design, the apparatus may include a transceiver unit and a processing unit. An example is as follows:

The transceiver unit is configured to obtain a transmission pattern combination of data including at least two data packets, where the transmission pattern combination includes at least two transmission patterns, and the transmission pattern indicates a transmission manner and/or a processing manner of the data packet.

The processing unit is configured to transmit the data based on the transmission pattern combination, where the transmission pattern is determined for each data packet in correspondence to a matching condition, and the matching condition is associated with feature information of the data packet.

Optionally, the transceiver unit is further configured to receive, from a first network device, first indication information indicating the transmission pattern combination.

In a possible design, for specific content included in the transmission pattern combination and the first indication information and the second indication information, refer to the specific descriptions of the transmission pattern combination and the first indication information and the second indication information in the first aspect. Details are not described herein again.

Optionally, the transceiver unit is further configured to receive, from the first network device, indication information indicating the matching condition.

Optionally, the transceiver unit is further configured to receive, from the first network device, information indicating a reference data packet.

Optionally, the transceiver unit is further configured to receive a quantity that is of consecutive data packets transmitted in each transmission pattern and that is indicated by the first network device.

Optionally, the processing unit is further configured to indicate, in a transmission parameter corresponding to the transmission pattern, information about the quantity of consecutive data packets transmitted in the transmission pattern.

Optionally, the transceiver unit is further configured to receive, from the first network device, the first indication information indicating an index of each transmission pattern in the transmission pattern combination.

Optionally, the transceiver unit is further configured to send an update request message to the first network device, where the update request message requests to configure or update the transmission pattern combination.

Optionally, the transceiver unit is further configured to receive, from the first network device, activation state information indicating the transmission pattern or second indication information indicating to update the transmission pattern combination.

Optionally, the processing unit is further configured to update an activation state of the transmission pattern or update the transmission pattern combination based on the second indication information.

Optionally, the processing unit is further configured to select, based on the matching condition, the transmission pattern corresponding to the data packet; and the transceiver unit is further configured to transmit the data packet to the first network device or a second network device in the transmission pattern.

Optionally, the transceiver unit is further configured to receive the data packet from the first network device or a second network device in the transmission pattern.

According to a fifth aspect, an embodiment of this application provides a communication apparatus. The apparatus may be a network device, or may be a chip used for the network device. In a possible design, the apparatus has a function of implementing the method according to the second aspect or each possible implementation of the second aspect. The function may be implemented by hardware, or may be implemented by hardware by executing corresponding software. The hardware or the software includes one or more modules corresponding to the function. In a possible design, the apparatus may include a transceiver unit and a processing unit. An example is as follows:

In a possible implementation, the transceiver unit is configured to send first indication information to a terminal, where the first indication information indicates a transmission pattern combination of data including at least two data packets, the transmission pattern combination includes at least two transmission patterns, and the transmission pattern indicates a transmission manner and/or a processing manner of the data packet.

Optionally, the processing unit is configured to transmit the data based on the transmission pattern combination, where the transmission pattern is determined for each data packet in correspondence to a matching condition, and the matching condition is associated with feature information of the data packet.

In a possible design, for definitions or descriptions of related terms, for example, for specific content included in the transmission pattern combination and the first indication information to the third indication information, refer to the specific descriptions of the transmission pattern combination and the first indication information to the third indication information in the second aspect. Details are not described herein again.

Optionally, the transceiver unit is further configured to indicate the matching condition to the terminal.

Optionally, the processing unit is further configured to indicate the matching condition by using the first indication information.

Optionally, the processing unit is further configured to indicate information about a reference data packet to the terminal, where in correspondence to the reference data packet, the transmission patterns are sequentially selected from the transmission pattern combination.

Optionally, the processing unit is further configured to indicate, to the terminal, a quantity of consecutive data packets transmitted in each transmission pattern.

Optionally, the transceiver unit is further configured to send, to the terminal, the first indication information indicating an index of each transmission pattern in the transmission pattern combination.

Optionally, the transceiver unit is further configured to receive, from the terminal, an update request message requesting to configure or update the transmission pattern combination. Optionally, the processing unit is further configured to configure or update the transmission pattern combination based on the update request message.

Optionally, the transceiver unit is further configured to send, to the terminal, activation state information indicating the transmission pattern or second indication information indicating to update the transmission pattern combination.

Optionally, the transceiver unit is further configured to send third indication information to a second network device, where the third indication information indicates information associated with a to-be-transmitted data packet between the terminal and the second network device.

Optionally, the processing unit is further configured to select, based on the matching condition, the transmission pattern corresponding to the data packet. Optionally, the transceiver unit is further configured to transmit the data packet to the terminal in the transmission pattern.

Optionally, the transceiver unit is further configured to receive the data packet from the terminal in the transmission pattern.

Another possible implementation is as follows:

Optionally, the transceiver unit is configured to receive third indication information from a first network device, where the third indication information indicates information associated with a to-be-transmitted data packet between a second network device and a terminal, a transmission pattern is determined for each data packet in correspondence to a matching condition, the transmission pattern indicates a transmission manner and/or a processing manner of the data packet, and the matching condition is associated with feature information of the data packet. Optionally, the processing unit is configured to transmit the data packet based on the third indication information.

Optionally, the processing unit is further configured to perform, based on the third indication information, resource scheduling and/or configuration associated with transmission of the data packet.

In a possible design, for definitions or descriptions of related terms, for example, specific content included in the transmission pattern combination, refer to the specific descriptions of the transmission pattern combination in the third aspect. Details are not described herein again.

According to a sixth aspect, an embodiment of this application provides a communication apparatus, including a processor and a memory. The memory is configured to store computer-executable instructions. When the apparatus runs, the processor executes the computer-executable instructions stored in the memory, to enable the apparatus to perform any method in the methods according to the first aspect to the third aspect or the possible implementations of the first aspect to the third aspect.

According to a seventh aspect, an embodiment of this application provides a communication apparatus, including a unit or a means (means) configured to perform steps of any method in the methods according to the first aspect to the third aspect or the possible implementations of the first aspect to the third aspect.

According to an eighth aspect, an embodiment of this application provides a communication apparatus, including a processor and an interface circuit. The processor is configured to communicate with another apparatus by using the interface circuit, and perform any method in the methods according to the first aspect to the third aspect or the possible implementations of the first aspect to the third aspect. There are one or more processors.

According to a ninth aspect, an embodiment of this application provides a communication apparatus, including a processor, configured to connect to a memory, and invoke a program stored in the memory, to perform any method in the methods according to the first aspect to the third aspect or the possible implementations of the first aspect to the third aspect. The memory may be located inside or outside the apparatus. There are one or more processors.

According to a tenth aspect, an embodiment of this application further provides a computer-readable storage medium. The computer-readable storage medium stores instructions. When the instructions are on a computer, a processor is enabled to perform any method in the methods according to the first aspect to the third aspect or the possible implementations of the first aspect to the third aspect.

According to an eleventh aspect, an embodiment of this application further provides a computer program product. The computer product includes a computer program. When the computer program is run, any method in the methods according to the first aspect to the third aspect or the possible implementations of the first aspect to the third aspect is performed.

According to a twelfth aspect, an embodiment of this application further provides a chip system, including a processor, configured to perform any method in the methods according to the first aspect to the third aspect or the possible implementations of the first aspect to the third aspect.

According to a thirteenth aspect, an embodiment of this application further provides a communication system, including the terminal in any one of the possible designs of the first aspect and the first network device in any one of the possible designs of the second aspect.

Optionally, the communication system may further include the second network device in any one of the possible designs of the third aspect.

For technical effects achieved by any one of the design manners of the fourth aspect to the thirteenth aspect, refer to technical effects achieved by the data transmission method according to any one of the possible designs of the foregoing aspects. Details are not described again.

BRIEF DESCRIPTION OF THE DRAWINGS

FIG. 1 is a schematic diagram of a network architecture to which an embodiment of this application is applicable;

FIG. 2 is a schematic diagram of a communication method according to an embodiment of this application;

DETAILED DESCRIPTION OF ILLUSTRATIVE EMBODIMENTS

Figure 3:
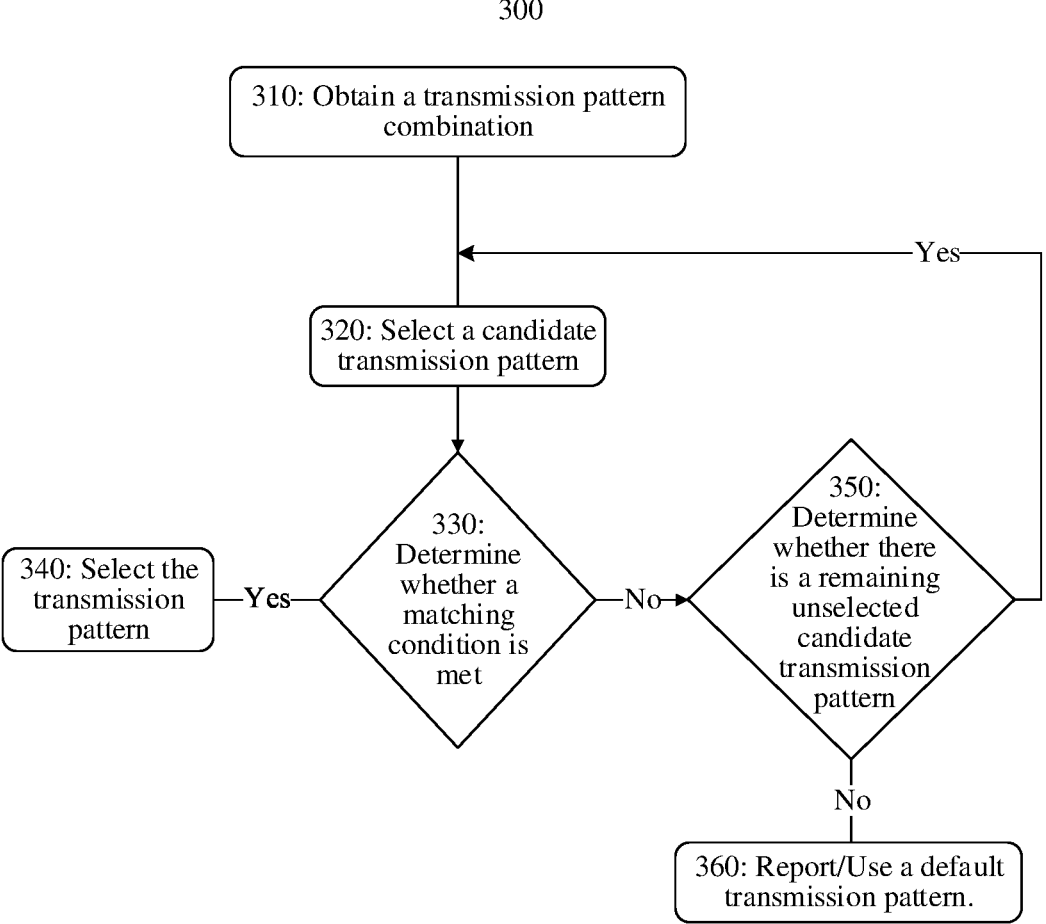
FIG. 3 is a schematic diagram of another communication method according to an embodiment of this application.

To describe the technical solutions in this application more clearly, the following describes some embodiments of this application with reference to the accompanying drawings.

First, some terms in embodiments of this application are explained and described, to facilitate understanding by a person skilled in the art.

(1) A terminal may be a wireless terminal device that can receive scheduling and indication information from a network device. The wireless terminal device may be a device that provides a user with voice and/or data connectivity, a handheld device having a wireless connection function, or another processing device connected to a wireless modem. The terminal device may communicate with one or more core networks or the Internet by using a radio access network (RAN). The terminal device may be a mobile terminal device, for example, a mobile phone (also referred to as a "cellular" phone, a mobile phone), a computer, or a data card, for example, may be a portable, pocket-sized, handheld, computer built-in, or vehicle-mounted mobile apparatus that exchanges voice and/or data with the radio access network. The wireless terminal device may also be referred to as a system, a mobile station, a mobile station (mobile station, MS), a remote station (remote station), an access point (access point, AP), a remote terminal device, an access terminal device, a user terminal device, a user agent, a subscriber station (SS), customer premises equipment (CPE), a terminal, user equipment (UE), a mobile terminal (MT), or the like. Alternatively, the terminal device may be a wearable device (a smartwatch, a smart band, or the like), or may be a smart furniture (or home appliance), an automobile in the Internet of vehicles, a robotic arm in an industrial Internet, an intelligent refueling device, or the like, or a terminal device in a next-generation communication system, for example, a fifth generation (5th generation, 5G) communication system, a terminal device in a future evolved public land mobile network (PLMN), or the like.

(2) A network device is a device in a wireless network. For example, the network device may be a radio access network (RAN) node (or device) that connects a terminal to the wireless network, or may be referred to as a base station. Currently, examples of some RAN devices are: a new generation base station (generation NodeB, gNodeB) in a 5G communication system, a transmission reception point (transmission reception point, TRP), an evolved NodeB (evolved NodeB, eNB), a NodeB (NodeB, NB), a home base station (for example, a home evolved NodeB, or a home NodeB, HNB), a baseband unit (baseband unit, BBU), or a wireless fidelity (Wi-Fi) access point (AP). In addition, in a network structure, the network device may include a central unit (CU) node, a distributed unit (DU) node, or a RAN device including a CU node and a DU node. In addition, in another possible case, the network device may be another apparatus that provides a wireless communication function for the terminal device. A specific technology and a specific device form that are used by the network device are not limited in embodiments of this application. For ease of description, in embodiments of this application, an apparatus that provides a wireless communication function for the terminal device is referred to as a network device or an access network device.

(3) Protocol layer: Communication between the RAN device and the terminal device complies with a specific protocol layer structure. For example, a control plane protocol layer structure may include functions of protocol layers such as a radio resource control (RRC) layer, a packet data convergence protocol (PDCP) layer, a radio link control (RLC) layer, a media access control (MAC) layer, and a physical layer. A user plane protocol layer structure may include functions of protocol layers such as the PDCP layer, the RLC layer, the MAC layer, and the physical layer. In a possible implementation, a service data adaptation protocol (SDAP) layer may be further included above the PDCP layer. The RRC layer is mainly configured to broadcast system information, maintain an RRC connection to the terminal, manage a radio bearer with the terminal, manage a key, and so on. For a user plane, the PDCP layer is mainly used for header compression and decompression, user plane data transmission, encryption, and decryption. For a control plane, the PDCP layer is mainly used for encryption and integrity protection, control plane data transmission, and the like. The RLC layer is mainly used for error correction based on an automatic repeat request (ARQ), concatenation, segmentation, and reassembly of an RLC service data unit (SDU), and the like. The MAC layer is mainly used for MAC SDU multiplexing, hybrid automatic repeat request (HARQ) transmission, and the like. The PHY layer is mainly used for encoding and decoding processing, modulation and demodulation, antenna mapping, and the like. The SDAP layer is mainly used to perform mapping between a quality of service (QoS) flow and a radio bearer, and identify a quality of service flow identifier (QFI) for an uplink or downlink data packet.

The RAN device may implement functions of protocol layers such as RRC, PDCP, RLC, and MAC by using one node or a plurality of nodes. For example, in an evolved structure, the RAN device include a CU and a DU, and a plurality of DUs may be all controlled by one CU. Division may be performed for the CU and the DU based on protocol layers of a wireless network. For example, the functions of the PDCP layer and the protocol layers above the PDCP layer are set on the CU, and the functions of the protocol layers below the PDCP layer such as the RLC layer and the MAC layer are set on the DU. Such protocol layer division is merely an example, and there may be division of other protocol layers.

The terms "system" and "network" may be used interchangeably in embodiments of this application. "At least one" means one or more, and "a plurality of" means two or more. The term "and/or" describes an association relationship between associated objects and represents that three relationships may exist. For example, A and/or B may represent the following cases: Only A exists, both A and B exist, and only B exists, where A and B may be singular or plural. The character "/" generally indicates an "or" relationship between the associated objects. At least one of the following items (pieces) or a similar expression thereof indicates any combination of these items, including a single item (piece) or any combination of a plurality of items (pieces). For example, "at least one of A, B, and C" includes A, B, C, AB, AC, BC, or ABC.

In addition, unless otherwise specified, ordinal numbers such as "first" and "second" mentioned in embodiments of this application are used to distinguish between a plurality of objects, but are not intended to limit a sequence, a time sequence, priorities, or importance of the plurality of objects. For example, first information and second information are merely used to distinguish between different information, and do not indicate different priorities, importance, or the like of the two types of information.

FIG. 1 is a schematic diagram of a network architecture 100 to which an embodiment of this application is applicable. As shown in FIG. 1, a terminal (a terminal 110 shown in the figure) may access a wireless network, to obtain a service from an external network (for example, the Internet) through the wireless network, or communicate with another device through the wireless network, for example, may communicate with another terminal. The wireless network includes a network device (or a radio access network (radio access network, RAN) device, where a network device 120 is shown in the figure). The network device 120 is configured to connect the terminal 110 to the wireless network. Optionally, the terminal 110 may communicate with the network device 120 through a radio interface (for example, a Uu interface).

In a possible manner, the terminal may access the wireless network through a plurality of network devices. For example, the terminal is simultaneously connected to two network devices for data transmission. For example, the two network devices are respectively referred to as a master node (MN) and a secondary node (SN). That is, the terminal no shown in FIG. 1 may further communicate with a network device 130.

In a possible manner, the network device 120 and the network device 130 each may include a CU and a DU.

It should be understood that quantities of devices in a communication system shown in FIG. 1 are merely used as an example. This embodiment of this application is not limited thereto. During actual application, the communication system may further include more terminals 110 and more RAN devices, and may further include another device. For example, although not shown, in addition to network functional entities shown in FIG. 1, the network architecture 100 shown in FIG. 1 may further include another functional entity, for example, a core network element. This is not limited.

The network architecture shown in FIG. 1 is applicable to communication systems of various radio access technologies. For example, the communication system may be a long term evolution (long term evolution, LTE) communication system, or may be a 5G (also referred to as new radio (NR)) communication system, or may be a transition system between an LTE communication system and a 5G communication system. The transition system may also be referred to as a 4.5G communication system. Certainly, the communication system may alternatively be a future communication system. The network architecture and service scenarios described in embodiments of this application are intended to describe the technical solutions in embodiments of this application more clearly, and do not constitute a limitation on the technical solutions provided in embodiments of this application. A person of ordinary skill in the art may know that, with evolution of the communication network architecture and emergence of new service scenarios, the technical solutions provided in embodiments of this application are also applicable to similar technical problems.

FIG. 2 shows a data transmission method 200 according to an embodiment of this application, to implement data transmission between a terminal and a network device. The method is interactively performed by the network device and the terminal. Certainly, the method may alternatively be interactively executed by components of the network device and the terminal, for example, chips or chip systems. For example, the network device is a radio access network device, and a wireless communication interface, for example, an LTE air interface or an NR air interface, is established between the terminal and the radio access network device. For ease of description, in the following, an example in which the method is performed by the network device or the terminal is used. As shown in FIG. 2, the method 200 may include the following steps.

S210: The network device and the terminal exchange a transmission pattern combination.

Step S210 may be understood as aligning or indicating the transmission pattern combination between the network device and the terminal. The transmission pattern combination may be indicated between the network device and the terminal by using a message or signaling. For example, the network device indicates the transmission pattern combination to the terminal in one or more messages. It is easily understood that alignment or configuration of the transmission pattern combination is completed between the network device and the terminal through step S210.

Optionally, the transmission pattern combination is exchanged between the terminal and a single network device (for example, a first network device).

Alternatively, the transmission pattern combination is exchanged between the terminal and a plurality of network devices (for example, a first network device and a second network device). For example, there is a communication connection between each of the first network device and the second network device and the terminal.

The transmission pattern combination indicates transmission patterns of data including at least two data packets, the transmission pattern combination includes at least two transmission patterns, and the transmission pattern indicates a transmission manner and/or a processing manner of the data packet. The transmission pattern combination may also be referred to as a transmission pattern set, a transmission list, a transmission pattern configuration, or the like.

For example, the data including the at least two data packets may be understood as data associated with a service, for example, data associated with a URLLC service, an eMBB service, or an mMTC service. For example, the data may be a data packet that is generated by an application layer of the terminal and that needs to be sent to an application server or that is generated by an application server and that needs to be sent to the terminal device, or a data packet, such as RRC configuration signaling or PDCP/RLC control signaling, that is generated by a protocol layer of the terminal and that supports upper-layer data communication.

For example, the transmission pattern includes a transmission parameter, and the transmission parameter indicates the transmission manner and/or the processing manner of the data packet. For example, the transmission manner and/or the processing manner indicate/indicates one or more of transmission resource information, transmission path information, or reliability processing manner information of the data packet. The transmission parameter may also be referred to as a transmission configuration, a transmission control parameter, or the like. It may be understood that the transmission pattern may include one or more transmission parameters, that is, the transmission pattern may include a group of transmission parameters.

For example, the transmission pattern includes the transmission parameter and a matching condition parameter, and the matching condition parameter indicates a matching condition. For example, the transmission pattern includes at least one matching condition parameter and the transmission parameter. For example, the matching condition parameter is a parameter indicating the matching condition, and the matching condition parameter (or the matching condition) is related to a parameter or assistance information that helps optimize data packet transmission performance, for example, feature information or resource information of the data packet. Optionally, the matching condition may also be associated with one or more of an activation state of the transmission pattern, information indicating whether a trigger condition for transmitting the data packet in a plurality of transmission patterns is met, and a service transmission state between the terminal and the network device. For example, when a data packet that meets the at least one reflected matching condition arrives, the terminal transmits the data packet by using a transmission parameter indicated in a transmission pattern that includes the at least one matching condition parameter.

For example, there is an association relationship between the transmission pattern in the transmission pattern combination and the matching condition. For example, each transmission pattern corresponds to at least one matching condition, or each transmission pattern is associated with at least one matching condition. The association relationship or a correspondence between the matching condition and the transmission pattern may be in a plurality of forms, for example, may be a table or a function. The association relationship between the matching condition and the transmission pattern may be exchanged between the terminal and the network device by using a message or signaling, or may be predefined. Optionally, the association relationship between the matching condition and the transmission pattern may be indicated by using one or more messages. For example, the matching condition, the transmission pattern, and the association relationship between the matching condition and the transmission pattern are separately indicated in a plurality of messages. For another example, the at least one matching condition and the association relationship between the at least one matching condition and the transmission pattern are indicated in a message. For another example, the transmission pattern and the matching condition corresponding to the transmission pattern are indicated in a message. It should be noted that the matching condition parameter (or matching condition information) in this embodiment of this application may be understood as a parameter indicating the matching condition, or a parameter that may reflect the matching condition. That is, the matching condition may be determined based on the matching condition parameter. For example, the data packet feature information includes at least one of the following: data packet size information, data packet type information, QoS parameter information corresponding to the data packet, importance level information corresponding to the data packet, or transmission sequence information of the data packet. Optionally, the data packet feature information may further include information indicating a receive end or a transmit end for transmitting the packet, for example, may include information indicating a target node of the data packet. It is easily understood that there are a plurality of possible implementations of obtaining the information associated with the matching condition. Optionally, the feature information of the data packet may be determined by the terminal, or may be obtained by interacting with another network element or device. For example, the terminal receives the importance level information of the data packet that is indicated by an upper layer; or the network device independently determines the data packet type information; or the terminal obtains the resource information by receiving an indication of the network device.

For example, the resource information is related to a resource used for transmitting the data packet. For example, the resource information may be usage state information of a current resource pool or resource congestion degree information. For example, when the matching condition is associated with the resource information, a corresponding transmission parameter may be determined based on an energy saving requirement of the terminal and the matching condition.

For example, an activation state of the transmission pattern (or the activation state information of the transmission pattern) reflects whether the transmission pattern is activated or deactivated.

For example, the information indicating whether the trigger condition for transmitting the data packet in the plurality of transmission patterns (or the transmission combination) is met includes: determining whether to perform data transmission by using the transmission pattern combination. For example, a trigger mechanism is determined between the terminal and the network device, and data transmission is performed between the terminal and the network device based on the transmission pattern combination only when a mechanism for performing data transmission based on the transmission pattern combination is triggered. Optionally, the triggering of the mechanism may be initiated by the network device. For example, the first network device indicates, to the terminal, indication information indicating whether to trigger the mechanism. Certainly, the triggering of the mechanism may alternatively be initiated by the terminal. For example, the terminal actively triggers or actively requests the network device to trigger the mechanism based on a transmission requirement. It is easily understood that there may also be a disabling trigger condition for the mechanism. That is, when the disabling trigger condition is met, the terminal and the network device are triggered to stop data transmission based on the transmission pattern combination.

For example, the service transmission state between the terminal and the network device may include information related to a service requirement. For example, if it is determined, based on the service requirement, that a service is an ultra-low latency service, the matching condition is used to select a transmission parameter that meets an ultra-low latency requirement.

In an optional implementation of step S210, S210 includes S211 and S212.

S211: The first network device indicates the transmission pattern combination to the terminal.

Correspondingly, the terminal obtains the transmission pattern combination.

In a possible implementation of S211, the first network device indicates the transmission pattern combination to the terminal in a manner of sending the transmission pattern combination to the terminal by the first network device by using a message or signaling. That is, the first network device indicates the transmission pattern combination to the terminal in one or more messages. For example, the first network device sends first indication information to the terminal, where the first indication information indicates the transmission pattern combination of the data including the at least two data packets. Alternatively, the first indication information indicates/is used to configure the at least two transmission patterns. Correspondingly, the terminal receives, from the first network device, the first indication information indicating the transmission pattern combination.

It is easily understood that the first indication information may be forwarded by the network device to the terminal via a relay terminal. In other words, the terminal may communicate with the network device via the relay terminal.

In a possible implementation, the transmission pattern includes the at least one matching condition parameter, and each matching condition parameter represents one matching condition of the data packet. In other words, the transmission pattern includes at least one piece of information indicating the matching condition and at least one transmission parameter.

In a possible implementation, the first network device indicates the matching condition to the terminal. It is easily understood that an action of indicating, by the first network device, the matching condition to the terminal may be performed in step S211, or may be performed before or after step S211.

Correspondingly, the terminal receives, from the first network device, the indication information indicating the matching condition.

The matching condition is used to select a better transmission pattern for the data packet from the transmission pattern combination. That is, when a matching condition corresponding to the transmission pattern is met, the data packet may be transmitted by using a transmission parameter corresponding to the transmission pattern. For example, the matching condition is related to a parameter or assistance information that helps optimize data packet transmission performance, for example, feature information or resource information of the data packet. Optionally, the matching condition may also be associated with an activation state of the transmission pattern, information indicating whether a determining condition for transmitting the data packet in a plurality of transmission patterns is met, and a service transmission state between the terminal and the network device.

Optionally, the first network device indicates the matching condition by using one or more messages, for example, indicates the matching condition by using the first indication information, that is, the transmission pattern and the matching condition may be indicated to the terminal in one piece of information. Certainly, the matching condition may alternatively be indicated by using other indication information. It is easily understood that the matching condition may alternatively be predefined. The matching condition in this embodiment of this application may also be referred to as an association condition, a filtering condition, or a trigger condition. This is not limited in this application.

In an optional design, the first indication information includes the foregoing transmission pattern combination, that is, explicitly indicates content of the transmission pattern combination. In another optional design, the first indication information indicating an index of each transmission pattern in the transmission pattern combination is sent to the terminal, that is, the first indication information includes the index or an identifier of each transmission pattern in the transmission pattern combination. Correspondingly, the terminal receives, from the first network device, the first indication information indicating the index of each transmission pattern in the transmission pattern combination.

For example, the first indication information indicates indexes of N transmission patterns, for example, {index (index), index 1, . . . , index N−1}. It is easily understood that a number may alternatively start from 1, and N is an integer greater than or equal to 2.

It is easily understood that before step S211, the method may further include: The first network device determines the transmission pattern combination. For example, the first network device generates or obtains the transmission pattern combination. Optionally, the first network device generates the transmission pattern combination according to a specific rule. The rule may be related to one or more of resource information, a transmission path, transmission security performance, or data feature information of data transmission.

For example, a message or signaling (for example, the first indication information) sent by the network device to the terminal is a higher layer message, for example, a broadcast message, a system message, a downlink message in an access process, radio resource control (RRC) signaling, media access control control element (MAC CE), or physical layer control signaling. Alternatively, the message or the signaling may be physical layer downlink control information (DCI), or the like. This is not limited in this application.

When the transmission pattern combination is exchanged between the terminal and the plurality of network devices (for example, the first network device and the second network device), step S210 may further include the following step:

Step S212: The first network device indicates the transmission pattern combination to the second network device.

Correspondingly, the second network device receives the indication information of the transmission pattern combination.

Step S212 may be understood as that the first network device and the second network device negotiate or exchange the transmission pattern combination corresponding to the data including the at least two data packets, or the first network device indicates, to the second network device, information associated with a to-be-transmitted data packet between the terminal and the second network device.

In a possible implementation of S212, the first network device indicates the transmission pattern combination to the second network device. For example, the first network device sends third indication information to the second network device, where the third indication information indicates the transmission pattern combination, or the third indication information indicates the information associated with the to-be-transmitted data packet between the terminal and the second network device. Correspondingly, the second network device receives the third indication information from the first network device. The transmission pattern is determined for each data packet in correspondence to the matching condition. "In correspondence to the matching condition" may be understood as "determining whether the matching condition is met", "according to the matching condition", or "based on the matching condition". In other words, a transmission pattern corresponding to the data packet between the second network device and the terminal is selected from the transmission pattern combination based on the matching condition.

In a possible implementation, after determining the transmission pattern combination, the first network device may send the determined transmission pattern to the second network device, and the second network device may accordingly determine, data packets that need to be transmitted through a link on a second network device side. For example, the third indication information indicates the transmission pattern combination, or the third indication information indicates one or more transmission patterns associated with the second network device in the transmission pattern combination.

In a possible implementation, after determining the transmission pattern combination, the first network device may determine data packets that need to be transmitted through a link on a second network device side, and indicate, to the second network device, information associated with the data packet that needs to be transmitted on the second network device side, to assist the second network device in resource scheduling and/or configuration. For example, the third indication information indicates the information associated with the to-be-transmitted data packet between the terminal and the second network device. The information associated with the data packet includes at least one of the following: bitmap information of the data packet, transmission pattern information used by the data packet, transmission parameter information used by the data packet, or arrival time and/or period information of the data packet.

In a possible implementation, after receiving the third indication information, the second network device sends a reply message to the first network device, to indicate that receiving of the third indication information is acknowledged and/or indicate agreement to perform communication based on the third indication information. Optionally, the reply message includes transmission pattern suggestion information, and the transmission pattern suggestion information indicates a transmission pattern recommended or suggested by the second network device, or indicates that a transmission pattern configuration needs to be updated. Optionally, the transmission pattern suggestion information further includes a reason why the transmission pattern needs to be updated. In this manner, the transmission pattern combination may be exchanged between the network devices, and the transmission pattern combination may be further updated.

For example, a message or signaling (for example, the third indication information) is sent between the network devices through a radio interface (for example, an Xn interface). For example, the first network device may transfer the transmission pattern of the terminal to the second network device by using a secondary station addition request message (SN addition request) message or a secondary station modification request message (SN modification request) message on the Xn interface. It is easily understood that the foregoing message is merely an example, and this is not limited in this embodiment of this application. Optionally, the first network device may indicate arrival time information and/or period information of the first data packet to the second network device, and the second network device determines, based on the information indicated by the first network device, time points at which the terminal needs to send data packets to the second network device. Optionally, the transmission pattern sent by the first network device to the second network device may include only information associated with the second network device side. For example, if the transmission pattern includes LCH information, the transmission pattern sent by the first network device to the second network device may include only information about an LCH configured on the second network device side. If the LCH information is represented by using a bitmap (bitmap), the bitmap sent by the first network device to the second network device includes only bit (bit) information corresponding to the LCH configured on the second network device side.

For example, for a periodic service, the first network device may indicate, by using a bitmap (bitmap), data packets that need to be transmitted via the second network device. For example, a bitmap={0010} indicated by the first network device to the second network device indicates that in data packets that arrive periodically, the third data packet in every four data packets needs to be transmitted through the link on the second network device side. Optionally, for an industrial Internet of things (Industrial Internet of things, IIoT) service, time sensitive communication assistance information (time sensitive communication assistance information, TSCAI) is exchanged between the first network device and the second network device, where the time sensitive communication assistance information includes arrival time and period information of a data packet. The second network device may determine, based on the arrival time and the period information of the service in the TSCAI and with reference to the bitmap indicated by the first network device, time points at which the UE needs to send data to the second network device, to determine to perform resource scheduling and configuration. Optionally, the first network device may alternatively indicate, to the second network device, arrival time information and/or period information of a data packet corresponding to the first bit (bit) in the bitmap, and the second network device determines, based on the information indicated by the first network device, time points at which the UE needs to send data packets to the second network device.

In a possible implementation, the first network device is a primary station, and the second network device is a secondary station; or the first network device is a secondary station, and the second network device is a primary station. This is not limited in embodiments of this application.

In a possible implementation, the first network device is a CU, and the second network device is a DU, or the first network device is a DU, and the second network device is a CU. Optionally, the first network device may send the third indication information to the second network device by using a terminal context setup request message (UE Context Setup Request) or a terminal context modification message (UE Context Modification Request).

It is easily understood that S212 is an optional step. For example, when the terminal communicates with a single network device, S212 may be skipped.

Through the foregoing step S210, the transmission pattern combination is exchanged between devices (for example, between the terminal and a single network device, or between the terminal and the plurality of network devices). For example, the transmission pattern combination is aligned between the terminal and the network device.

S220: The terminal and the network device perform data transmission based on the transmission pattern combination.

The transmission pattern is determined for each data packet in correspondence to the matching condition, and the matching condition is associated with the feature information of the data packet. It is easily understood that the matching condition is not limited to being associated with the feature information of the data packet, and all information related to an implementation that facilitates refined control on data packet transmission may be associated with the matching condition. For example, the matching condition may be associated with one or more of the feature information of the data packet, the resource information, the activation state of the transmission pattern, the information indicating whether the trigger condition for transmitting the data packet in the plurality of transmission patterns is met, and the service transmission state between the terminal and the network device.

In an optional manner of step S220, S220 includes S221 and S222.

S221: The terminal determines the transmission pattern for the data packet in correspondence to the matching condition.

The determining the transmission pattern for the data packet in correspondence to the matching condition may be understood as selecting or determining the transmission pattern for the data packet from the transmission pattern combination based on the matching condition, or determining the corresponding transmission pattern for each data packet.

For example, the terminal determines whether each data packet meets/satisfies at least one matching condition corresponding to the transmission pattern, and selects the transmission pattern for the data packet if the at least one matching condition is met. It is easily understood that when the transmission pattern corresponds to a plurality of matching conditions, the data packet needs to meet the plurality of matching conditions corresponding to the transmission pattern.

In a possible implementation, a matching condition of a transmission pattern A is: (1) A size of a data packet is less than a first threshold. When it is determined that a size of a data packet A is less than the first threshold, that is, when the data packet A meets the matching condition (1) of the transmission pattern A, it may be determined that a transmission pattern corresponding to or used by the data packet A is the transmission pattern A.

In a possible implementation, matching conditions of the transmission pattern A further include: (2) A data packet includes an I frame. When it is determined that the size of the data packet A is less than the first threshold and the data packet A includes an I frame, that is, when the data packet A meets the matching conditions (1) and (2) of the transmission pattern A, it may be determined that a transmission pattern corresponding to or used by the data packet A is the transmission pattern A. Optionally, when the data packet A meets the matching condition (1) of the transmission pattern A but does not meet the matching condition (2), it may be determined that a transmission pattern corresponding to or used by the data packet A is not the transmission pattern A. That is, only when the data packet A meets all matching conditions corresponding to the transmission pattern A, it can be determined that the transmission pattern A is used to transmit the data packet A.

In a possible manner, when the to-be-transmitted data packet does not meet a matching condition corresponding to any transmission pattern in the foregoing transmission pattern combination, a default transmission pattern may be selected for the data packet, and the data packet is processed and transmitted by using a transmission parameter included in the default transmission pattern. For example, the default transmission pattern is indicated by the network device. For example, the default transmission pattern and the foregoing transmission pattern combination may be indicated in one message, that is, the default transmission pattern is included in the foregoing first indication information, or the default transmission pattern and the foregoing transmission pattern combination may be indicated in different messages. This is not limited in this embodiment of this application. For example, the default transmission pattern is predefined or preconfigured. For example, during configuration, the network device does not include the matching condition parameter in the default transmission pattern. When the data packet does not meet the matching condition reflected by the matching condition parameter included in the non-default transmission pattern, the data packet is processed and transmitted by using the transmission parameter included in the default transmission pattern.

Through the foregoing step S221, the corresponding transmission pattern combination is selected for the data packet from the transmission pattern combination based on the matching condition, so that data packets with different features are processed and transmitted by using appropriate transmission parameters. This helps implement refined control on data packet transmission and ensure transmission performance and resource usage efficiency.

S222: The terminal transmits the data to the network device in the determined transmission pattern.

It may be understood that in this step, the terminal transmits the data to the network device based on the transmission parameter indicated in the determined transmission pattern. Correspondingly, the network device receives the data from the terminal.

For example, that the data packet is transmitted based on the transmission parameter included in the transmission pattern is that one or more of the transmission path information, the transmission resource information, or a reliability processing manner for data packet transmission is determined based on the transmission parameter.

It is easily understood that when the terminal communicates with a single network device (for example, the first network device), in a possible implementation of S222, the terminal transmits the data to the first network device based on the transmission parameter indicated in the determined transmission pattern. For example, the terminal sends the data packet A to the first network device based on the determined transmission pattern A. Correspondingly, the first network device receives the data packet A from the terminal.

Optionally, when the terminal is connected to the plurality of network devices, a distinction between a receive end and a transmit end of a data packet may be determined based on a transmission pattern corresponding to the data packet and/or feature information of the data packet. For example, if feature information of the data packet indicates that a destination node of the data packet is the second network device, the terminal sends the data packet to the second network device. For another example, if a transmission parameter in the transmission pattern corresponding to the data packet is related to the second network device, the terminal may send the data packet to the second network device. For example, the transmission pattern includes LCH information configured on the second network device side.

For example, when the terminal communicates with the plurality of network devices (for example, the first network device and the second network device), in another possible implementation of S222, the terminal transmits the data to the first network device and/or the second network device based on the transmission parameter indicated in the determined transmission pattern. For example, the terminal determines corresponding transmission patterns for data packets B and C, where the data packet B corresponds to a transmission pattern B, and the data packet C corresponds to a transmission pattern C. The terminal sends the data packet B to the first network device in the transmission pattern B, and/or the terminal sends the data packet C to the second network device in the transmission pattern C.

Optionally, before S222, the method may further include: The network device configures or schedules a resource for the terminal device in advance. That is, before the data is transmitted between the terminal and the network device, the network device may configure or schedule the resource in advance. For example, the second network device indicates resource information to the terminal, to match data transmission of the terminal. This helps reduce a service delay and improve resource utilization.

In another optional manner of step S220, S220 includes S223 and S224.

S223: The first network device determines the transmission pattern for the data packet in correspondence to the matching condition.

A manner in which the first network device determines the transmission pattern for the data packet in correspondence to the matching condition is similar to that in which the terminal determines the transmission pattern for the data packet in correspondence to the matching condition. For specific content, refer to related descriptions in step S221. Details are not described again.

S224: The first network device transmits the data to the terminal in the determined transmission pattern.

It may be understood that in this step, the first network device transmits the data to the terminal based on the transmission parameter indicated in the determined transmission pattern. Correspondingly, the terminal receives the data from the first network device.

In another optional manner of step S220, S220 includes S225 and S226.

S225: The second network device determines the transmission pattern for the data packet in correspondence to the matching condition.

S226: The second network device transmits the data to the terminal in the determined transmission pattern.

A manner in which the second network device sends the data to the terminal in the transmission pattern is similar to that in which the first network device sends the data to the terminal in the transmission pattern. For steps S225 and S226, refer to related descriptions of steps S223 and S224. Details are not described again.

Optionally, the method 200 further includes the following step:

S230: Update the transmission pattern combination.

Updating the transmission pattern combination may be understood as adding or deleting a transmission pattern, updating the transmission parameter in the transmission pattern, or indicating the activation state information of the transmission pattern. It is easily understood that a sequence of performing S230 is not limited. For example, S230 may be performed before or after S220, or S230 is performed in a process of performing S220, that is, step S230 may be included in step S220.

It is easily understood that step S230 may be triggered by the terminal or the network device. For example, the terminal sends an update request message to the network device, to request to configure or update the transmission pattern combination. Optionally, the update request message includes a request reason or a recommended transmission pattern or parameter. Correspondingly, the network device receives, from the terminal, the update request message requesting to configure or update the transmission pattern combination. Optionally, the update request message includes one or more of a request reason, a recommended transmission pattern, or a recommended transmission parameter. Optionally, the transmission pattern combination is updated based on the update request message. Optionally, the network device sends, to the terminal, information for updating the transmission pattern combination. Certainly, the network device may independently determine that the transmission pattern combination needs to be updated or the transmission parameter in the transmission pattern needs to be updated.

In a possible manner of step S230, the first network device sends, to the terminal, the activation state information indicating the transmission pattern or second indication information indicating to update the transmission pattern combination. Correspondingly, the terminal receives, from the first network device, the activation state information indicating the transmission pattern or the second indication information indicating to update the transmission pattern combination. The terminal updates the activation state of the transmission pattern or updates the transmission pattern combination based on the second indication information.

Optionally, a message indicating to update the transmission pattern combination may be layer 1 (layer 1, L1) or layer 2 (layer 2, L2) signaling, for example, a MAC CE.

Optionally, that the transmission pattern combination is updated includes: The transmission pattern used by the terminal is activated/deactivated or switched, or the transmission parameter in the transmission pattern of the terminal is adjusted.

Optionally, the transmission pattern in the transmission pattern combination is activated by default or deactivated by default. Optionally, the MAC CE is sent to the terminal to activate or deactivate the transmission pattern in the transmission pattern combination.

For example, the MAC CE sent by the network device to the terminal includes parameters such as an identifier of a DRB, a transmission pattern index, and a quantity of data packets, and indicates the terminal to adjust a transmission parameter, namely, a quantity of data packets, in a transmission pattern corresponding to the DRB, to a value indicated by the MAC CE.

For example, the network device may configure a transmission pattern for a DRB/a PDCP entity/an RLC entity or an SDAP entity of the terminal. After being configured, the transmission pattern may be activated by default or deactivated by default. The network device may switch, by using L1 or L2 signaling, a specific transmission pattern configured for the DRB/the PDCP entity/the RLC entity or the SDAP entity of the UE. For example, the network device activates/deactivates, by using a MAC CE, the transmission pattern configured for the DRB. The MAC CE may include DRB ID/LCH ID/QFI information indicating to activate a transmission pattern for a specific DRB/LCH/QoS flow. Optionally, the MAC CE may further carry a reference COUNT value or a reference sequence number (sequence number, SN) value indicating the UE to activate/deactivate a corresponding transmission pattern for a data packet corresponding to the reference COUNT value or the SN value.

For example, the network device may configure a plurality of transmission patterns for the DRB/the PDCP entity/the RLC entity or the SDAP entity of the UE, and each transmission pattern may be represented by using an index value. When configuring a transmission pattern for the UE by using RRC signaling, the network device (for example, a base station) may indicate an initially used transmission pattern, or no transmission pattern is initially used by default. The base station may activate or switch a specific transmission pattern configured for the DRB/the PDCP entity/the RLC entity of the UE by using L1 or L2 signaling. For example, the base station includes, in a MAC CE, an index of a transmission pattern to be activated or switched to. Optionally, the MAC CE may further carry a reference COUNT value or a reference SN value indicating the UE to make a specified transmission pattern effective for the reference COUNT value or the SN value.

Through step S230, the transmission pattern in the transmission pattern combination is quickly activated/deactivated or switched, or the transmission parameter in the transmission pattern is adjusted, so that a transmission parameter to be used for processing and transmission of the data packet can be quickly and flexibly controlled based on a change of a transmission channel, to improve resource utilization and ensure service transmission reliability.

A manner of exchanging the transmission pattern combination between the terminal and the network device is described in the foregoing steps S211 and S212. Optionally, when the terminal communicates with the plurality of network devices, in an optional implementation of step S210, S210 includes S213 and S214.

S213: The first network device indicates the transmission pattern combination to the terminal.

For details of S213, refer to related descriptions of S211. Details are not described again.

S214: The terminal indicates the transmission pattern combination to the second network device.

After the terminal receives the transmission pattern combination indicated by the first network device in S213, the terminal indicates the transmission pattern combination to the second network device. In other words, the terminal indicates, to the second network device, information associated with a to-be-transmitted data packet between the terminal and the second network device, for the second network device to match data packet transmission, for example, for assisting the second network device in resource scheduling, to ensure service transmission reliability and resource utilization.

In an optional design, the terminal indicates the transmission pattern combination to the second network device, for example, indicates all transmission patterns obtained from the first network device; or the terminal indicates, to the second network device, a transmission pattern associated with the second network device in the transmission pattern combination; or the terminal indicates, to the second network device, the information associated with the data packet associated with the second network device. For descriptions of the information associated with the data packet, refer to related descriptions in step S212. Details are not described again.

In another optional design, the terminal indicates, to the second network device, information associated with the to-be-transmitted data, for example, indicates period information or arrival time of the data packet.

Through the foregoing steps S213 and S214, the transmission pattern combination is exchanged between the terminal and the network device (for example, the first network device and the second network device), to ensure service reliability.

When the terminal communicates with the plurality of network devices, in an optional implementation of step S210, S210 includes S215 and S216.

S215: The first network device indicates the transmission pattern combination to the second network device.

For S215, refer to related descriptions in step S212. Details are not described again.

S216: The second network device indicates the transmission pattern combination to the terminal.

It is easily understood that a manner in which the second network device indicates the transmission pattern combination to the terminal is similar to that in which the first network device indicates the transmission pattern combination to the terminal. Therefore, for details, refer to related descriptions in step S211, and details are not described again.

For example, the foregoing describes several possible manners in which the first network device exchanges the transmission pattern combination with the terminal (or the terminal and the second network device) after determining the transmission pattern combination. In other words, the transmission pattern combination is determined by the first network device.

Optionally, the transmission pattern combination may alternatively be determined by the second network device. A manner or a principle in which the second network device determines the transmission pattern combination and exchanges the transmission pattern combination is similar to that in which the first network device determines the transmission pattern combination and then exchanges the transmission pattern combination with the terminal (or the terminal and the second network device), and a difference lies in replacing an action performed by the first network device with an action performed by the second network device, and replacing an action performed by the second network device with an action performed by the first network device. For details, refer to related descriptions of S211 to S216. Details are not described again in this embodiment of this application.

Optionally, the transmission pattern combination may alternatively be determined by the terminal. For example, the terminal may generate the transmission pattern combination according to a specific rule. The rule may be related to resource information, a transmission path, transmission security performance, data feature information, or the like of data transmission. It is easily understood that, after generating the transmission pattern combination, the terminal may separately indicate the transmission pattern combination to the first network device and the second network device in one case. For example, for details, refer to related descriptions in step S214. In another case, the terminal indicates the transmission pattern combination to the first network device. After receiving the transmission pattern combination indicated by the terminal, the first network device may further indicate the transmission pattern combination to the second network device. For example, for details, refer to related descriptions of steps S212 and S214.

Optionally, the transmission pattern combination is predefined, specified in advance (for example, specified in a protocol), or set. For example, the terminal does not need to receive an indication of the network device, and may learn of the foregoing transmission pattern combination based on a predefinition.

For example, a possible implementation of step S221 is as follows:

In correspondence to or according to a transmission sequence of the data packets, the transmission patterns are sequentially selected from the transmission pattern combination, that is, the matching condition is the transmission sequence of the data packets. It is easily understood that, the matching condition being the transmission sequence of the data packets may be exchanged between the devices, for example, indicated by the network device, or may be predefined or preconfigured.

Optionally, the manner includes determining or obtaining information about a reference data packet, and may be understood as: starting from the reference data packet, sequentially selecting the transmission patterns for the data packets according to the transmission sequence, or sequentially selecting the transmission patterns for data packets following the reference data packet for transmission. Optionally, the information about the reference data packet includes a sequence number of a PDCP SDU corresponding to the reference data packet. For example, a reference value (for example, a COUNT value or an SN value) may be indicated, and indicates that the DRB/the PDCP entity performs processing and transmission starting from a data packet corresponding to the reference COUNT/SN value in a manner specified by the transmission pattern. For example, the COUNT value has a length of 32 bits, and the SN is the 12 or 18 least significant bits of the COUNT value. For example, when the terminal receives a MAC CE indicating that a DRB identifier (identity, ID)=1 and COUNT=X, a MAC entity of the terminal indicates a PDCP entity corresponding to a DRB 1 to determine, starting from a data packet corresponding to COUNT=X, a corresponding transmission pattern according to a transmission sequence.

In a possible manner, the information about the reference data packet is determined by the device. In another possible manner, the information about the reference data packet is determined by another device. For example, after the information about the reference data packet is determined, the information is exchanged between the devices. For a manner of exchanging the information about the reference data packet, refer to the foregoing manner of exchanging the transmission pattern combination between the devices. For example, the first network device sends, to the terminal, the information indicating the reference data packet. Correspondingly, the terminal receives, from the first network device, the information indicating the reference data packet. Optionally, the terminal indicates the information about the reference data packet to the second network device.

Optionally, a quantity of consecutive data packets transmitted in each transmission pattern is exchanged between the devices (for example, between the terminal and the network device, or between the plurality of network devices). For the exchange manner, refer to the foregoing manner of exchanging the transmission pattern combination between the devices. For example, the first network device indicates, to the terminal, the quantity of consecutive data packets transmitted in each transmission pattern. Correspondingly, the terminal receives the quantity that is of consecutive data packets transmitted in each transmission pattern and that is indicated by the first network device.

Optionally, information about the quantity of consecutive data packets transmitted in the transmission pattern is indicated in the transmission parameter corresponding to the transmission pattern, that is, the quantity information is included in the transmission parameter.

For example, the first network device configures or indicates the transmission pattern combination for the terminal, where the transmission pattern combination includes a transmission pattern 1 (mode 1) and a transmission pattern 2 (mode 2), and the network device indicates to sequentially process data packets according to a sequence of the mode 1 and the mode 2. The mode 1 indicates that two consecutive data packets are transmitted only through an LCH 1, and the mode 2 indicates that duplication transmission is performed on one data packet through the LCH 1 and an LCH 2. In this case, for data packets that arrive in sequence, data packets 1 and 2 are transmitted through the LCH 1, duplication transmission is performed on a data packet 3 through the LCH 1 and the LCH 2, data packets 4 and 5 are transmitted through the LCH 1, and duplication transmission is performed on a data packet 6 through the LCH 1 and the LCH 2. By analogy, for example, a transmission ranking of the data packet 2 is between those of the data packet 1 and the data packet 3.

For example, the transmission pattern combination is exchanged between the devices and data transmission is performed based on the transmission pattern combination, so that a manner in which a data packet is processed and transmitted can be accurately controlled, to avoid a problem of continuous packet losses caused by channel fading when a plurality of data packets are transmitted through a same path, so as to ensure transmission reliability and effective resource utilization.

In a possible design, the transmission pattern is at a terminal granularity, or the transmission pattern may be at a bearer granularity or an entity granularity. For example, the transmission pattern is a transmission pattern corresponding to a DRB, a PDCP entity, an RLC entity, a QoS flow, a QFI, or an SDAP entity.

Optionally, the network device configures a transmission pattern for the DRB or the PDCP entity or the RLC entity of the terminal by using RRC signaling. For example, the network device adds a new transmission pattern (for example, transmissionPattern) information element to a DRB configuration information element, a PDCP configuration information element, or an RLC configuration information element of the terminal, to indicate a transmission pattern combination applied to the DRB/the PDCP entity/the RLC entity. The transmission pattern combination configured or indicated by the network device includes at least two transmission patterns (modes), and each mode includes one group of matching condition parameters and one group of transmission parameters. The one group of matching condition parameters includes at least one matching condition parameter, and each matching condition parameter may reflect one matching condition. The matching condition parameter included in each mode includes at least one of the following: (1) data packet size information, where for example, the data packet size information may be a data packet size value in a unit of bytes or bits, or a range of data packet sizes; (2) a QoS parameter, where for example, the QoS parameter may be at least one of QFI information, delay budget information, reliability requirement information, and reliability class information of a data packet; (3) information that reflects a service data type or feature, where for example, for a video frame, the information may be information such as an I frame, a P frame, a B frame, or a data packet transmission sequence; and (4) information such as importance of a data packet indicated by an upper layer when the upper layer delivers the data packet.

For example, the transmission parameter included in each mode includes but is not limited to at least one of the following: (1) LCH information; (2) replication state information; (3) a quantity of data packets; (4) LCP limit information; (5) shared spectrum Spectrum state; and (6) a channel access mode.

The LCH information indicates LCHs to be used for data packet transmission. For example, the LCH information may include an LCH list, where the LCH list includes information about at least one LCH to a maximum of M LCHs, and M is a positive integer. For example, M=4 is predefined in a protocol. Optionally, when the LCH list includes at least two LCHs, it may indicate that duplication transmission needs to be performed on data packets through a plurality of LCHs indicated by the LCH list, or it may indicate that data packets may be transmitted through any one of a plurality of LCHs indicated by the LCH list. For another example, the LCH information may include bitmap (bitmap) information.

Each bit in a bitmap corresponds to an LCH configured for the DRB. If a bit value is 1, it indicates that the corresponding LCH is used for data packet transmission; otherwise, it indicates that the corresponding LCH is not used for data packet transmission. If the DRB is a non-dual connectivity split bearer (dual connectivity split bearer, DC split bearer), optionally, bit positions in the bitmap one-to-one correspond to LCHs sorted in ascending or descending order of LCH IDs. If the DRB is a DC split bearer, optionally, LCHs are sorted in the following manner: an LCH corresponding to the first network device is top-ranked/ranked last, an LCH corresponding to the second network device is ranked last/top-ranked, and LCHs corresponding to stations are sorted in ascending/descending order of LCH IDs. Bit positions in the bitmap one-to-one correspond to the LCHs sorted in the foregoing manner.

The duplication (duplication) state information indicates whether duplication transmission needs to be performed on a data packet. When a replication state field exists, or when the field exists and has a first value, duplication transmission needs to be performed on the data packet. For example, duplication transmission is performed on the data packet through the plurality of LCHs indicated by the LCH list, or duplication transmission is performed on the data packet through a plurality of LCHs associated with the DRB/the PDCP entity, or duplication transmission is performed on the data packet through a plurality of LCHs that are associated with the DRB/the PDCP entity and that are currently in an active state. The first value may be 'true', '1', 'enabled', 'active', or the like. When the replication state field does not exist, or when the field exists and has a second value, duplication transmission does not need to be performed on the data packet. For example, the data packet is transmitted through the LCH indicated by the LCH list, or is transmitted by using a primary leg configured for the DRB/the PDCP entity. The second value may be 'false', 'o', 'disable', 'deactive', or the like.

The quantity of data packets indicates a quantity of consecutive data packets transmitted in the transmission pattern. A value of this field may be an integer ranging from M to P. For example, M and P are integers predefined in a protocol. For example, M=2 and P=64 are predefined in the protocol. Optionally, when the field does not exist, it indicates that one or N consecutive data packets are transmitted in the transmission pattern, where N is an integer greater than 1. Optionally, a value of N may be indicated by the network device or predefined in a protocol.

An LCP limit indicates that a data packet need to be transmitted on a resource that matches the LCP limit. For example, the LCP limitation includes information such as a subcarrier spacing of an uplink resource, duration of the uplink resource, a cell to which the uplink resource belongs, a bandwidth part (BWP) to which the uplink resource belongs, a CG to which the uplink resource belongs, a resource set (CORESET) to which DCI for scheduling the uplink resource belongs, or a search space (Search space).

The shared spectrum (Spectrum) state indicates whether the data packet can be transmitted on a shared spectrum. For example, when a shared Spectrum state field exists, or when the field exists and has a first value, the data packet can be transmitted on the shared spectrum. For example, the data packet may be delivered to an LCH of a cell associated with the shared spectrum. The first value may be 'true', '1', 'enabled', or the like. When the shared Spectrum state field does not exist, or when the field exists and has a second value, the data packet can be transmitted only on a licensed spectrum. The second value may be "false", "o", "disable", or the like.

The channel access mode indicates a specific channel access mode, where a data packet is transmitted on an unlicensed spectrum in the channel access mode. For example, the channel access mode may be at least one of semi-persistent channel access and dynamic channel access.

It is easily understood that the foregoing transmission parameter examples and specific implementations are merely examples, and are not intended to limit another implementation.

For example, the network device configures transmission patterns for one DRB of the terminal. The transmission patterns include a transmission pattern 1 (mode 1) and a transmission pattern 2 (mode 2), and each mode includes a matching condition parameter and a transmission parameter. A matching condition reflected by the matching condition parameter in the mode 1 is that a data packet includes an I frame, the transmission parameter indicates that duplication transmission needs to be performed on the data packet through the LCH 1 and the LCH 2. A matching condition reflected by the matching condition parameter in the mode 2 is that a data packet includes a B frame or a P frame, and the transmission parameter indicates that the data packet needs to be transmitted through the LCH 1. When a data packet arrives, the terminal determines whether the data packet includes an I frame, to determine a manner of processing and transmitting the data packet. For example, if the data packet 1 arrives, includes an I frame, and meets the matching condition in the mode 1, duplication transmission is performed on the data packet 1 through the LCH 1 and the LCH 2.

Optionally, in another transmission pattern configuration manner, the network device configures a transmission pattern at a QoS flow granularity for the terminal. For example, the network device configures transmission patterns for the SDAP entity of the terminal by using RRC signaling. For example, the network device adds a new transmission pattern (for example, transmissionPattern) information element to an SDAP configuration information element of the terminal, to indicate the transmission pattern of the SDAP entity. The transmission patterns configured by the network device include at least two transmission patterns, and each transmission pattern includes one group of matching condition parameters and one group of transmission parameters. The matching condition parameter included in each transmission pattern includes a QFI and at least one of the following: data packet size information or data packet type or feature information.

The transmission parameter included in each transmission pattern includes at least one of the following: DRB information, where for example, the DRB information may be a DRB identifier or a list of DRB identifiers, indicating DRBs for matching data packet transmission.

When a data packet arrives at the SDAP entity, the terminal first performs matching based on information about the data packet and the matching condition in each transmission pattern combination in the transmission pattern combination configured by the network device. When a matched transmission pattern combination exists, the terminal delivers the data packet to a corresponding DRB for processing based on a transmission parameter included in the transmission pattern combination. Optionally, the network device may configure a default transmission pattern. When a data packet does not meet a matching condition in any transmission pattern, the data packet is processed and transmitted by using a parameter included in the default transmission pattern.

It is easily understood that the foregoing example describes a case in which the transmission pattern includes the transmission parameter and the matching condition. Optionally, the matching condition and the transmission parameter may be obtained independently. This is not limited in this application.

Optionally, the network device may alternatively associate at least two transmission patterns with one QFI, and each transmission pattern includes one group of matching conditions and one group of transmission parameters. For the matching condition and the transmission parameter, refer to the foregoing related descriptions. A difference lies in that the transmission parameters may be related to the QFI, or related to a parameter that helps optimize data packet transmission performance. Details are not described again.

In a possible implementation of step S222, when the UE calculates a buffer status report (BSR), a PDCP layer may determine, based on a transmission pattern determined by a corresponding matching condition, that a corresponding data packet is to be delivered to a corresponding LCH, to indicate an amount of buffered data to the corresponding LCH. Optionally, the network device may configure or indicate a specific ratio, and the PDCP indicates the amount of buffered data to the corresponding LCH based on the ratio configured by the network device and a total amount of data buffered by the PDCP. For example, one DRB is associated with three LCHs, and the network device configures a ratio x:y:z for the DRB. When an amount of data to be transmitted by the PDCP entity of the DRB is D bytes, amounts of buffered data indicated by the PDCP entity to the three associated LCHs are x*D bytes, y*D bytes, and z*D bytes respectively.

In the foregoing method, the network device and the terminal exchange the transmission pattern combination, and perform data transmission based on the transmission pattern combination. The transmission pattern combination is exchanged between the network device and the terminal. This helps assist the network device or the terminal in matching data transmission. For example, this helps the network device perform resource scheduling or configuration or matching. For another example, this helps the terminal implement flexible transmission control. Data transmission is performed between the network device and the terminal based on the transmission pattern combination. This helps accurately control a manner in which the data packet is processed and transmitted, and data packets with different features are processed and transmitted by using appropriate transmission parameters. For example, the manner of sequentially selecting the transmission patterns based on the matching condition is applicable to a data packet that has a high requirement on a delay and is sensitive to channel fading, to avoid a problem of continuous packet losses caused by channel fading when a plurality of data packets are transmitted through a same path. The foregoing method further describes that the transmission pattern combination may be further updated in the data transmission process, and the transmission pattern combination is updated (for example, the transmission pattern used by the terminal is quickly activated/deactivated or switched, or the transmission parameter in the transmission pattern of the terminal is adjusted), so that a transmission parameter to be used for processing and transmission of the data packet can be quickly and flexibly controlled based on a change of a transmission channel, to improve resource utilization and ensure service transmission reliability.

Several possible implementation solutions are listed below as examples with reference to a specific scenario.

For example, an embodiment of this application describes a possible method 300 for determining a transmission pattern for a data packet in correspondence to a matching condition. It is easily understood that the method may be performed by a terminal or a network device, and the method includes the following steps.

310: Obtain a transmission pattern combination, and perform a next step, namely, 320. For a manner of obtaining the transmission pattern combination, refer to related descriptions of exchanging the transmission pattern in step S210. Details are not described again.

320: Select a candidate transmission pattern.

Optionally, a candidate transmission pattern is selected from the transmission pattern combination. A next step, namely, 330, is to be performed.

330: Determine whether a matching condition corresponding to the candidate transmission pattern is met.

If yes, 340 is performed. If not, step 350 is performed.

For example, the matching condition corresponding to the candidate transmission pattern is determined based on the candidate transmission pattern selected in 320, and whether a data packet meets the matching condition is determined. For a method for determining whether the data packet meets the matching condition, refer to related descriptions in step S221 and another part of this embodiment. Details are not described again. Optionally, the method further includes: obtaining a data packet, for example, generating a data packet or receiving a data packet from another device, where the data packet is a to-be-transmitted data packet. It is easily understood that, this is not limited to obtaining the data packet when step 330 is performed, or the data packet may be obtained before step 330 is performed.

340: Select the candidate transmission pattern. In other words, it is determined to transmit the to-be-transmitted packet in the candidate transmission pattern.

350: Determine whether there is a remaining unselected candidate transmission pattern.

If there is a remaining unselected candidate transmission pattern, step 320 is performed. If not, step 360 is performed.

For example, it is determined whether there is a remaining unselected candidate transmission pattern in the transmission pattern combination; if yes, step 320 is repeated; or if not, step 360 is performed, that is, transmission patterns in the transmission pattern combination are traversed until a transmission pattern with a met corresponding matching condition is found, or step 360 is performed after it is determined that there is no transmission pattern with a met matching condition.

360: Exit or select a default transmission pattern, or report to another device.

The another device may be a device that communicates with an execution body of this step. The reporting may be indicating to the another device that no transmission pattern meets the matching condition, or triggering update of the transmission pattern combination. It is easily understood that step 360 is merely an example, and is not limited.

For example, the method 300 may be used in combination with step S221, that is, the method 300 may be considered as a possible implementation of step S221.

According to the method 300, a transmission pattern is determined for a data packet in correspondence to a matching condition. This helps determine appropriate transmission parameters for data packets based on different transmission service requirements (for example, data packets with different features) for processing and transmission, to further ensure service transmission reliability and implement effective resource utilization.

The foregoing mainly describes the solutions provided in embodiments of this application from a perspective of interaction between the network device and the terminal. It may be understood that, to implement the foregoing functions, the network device or the terminal may include a corresponding hardware structure and/or a software module for performing each function. A person skilled in the art should be easily aware that, with reference to the units and algorithm steps described in embodiments disclosed in this application, embodiments of this application can be implemented in a form of hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, division into functional units may be performed on the terminal and the network device based on the foregoing method examples. For example, division into each functional unit may be based on each corresponding function, or two or more functions may be integrated into one unit. The integrated unit may be implemented in a form of hardware, or may be implemented in a form of a software functional unit.

Figure 4:
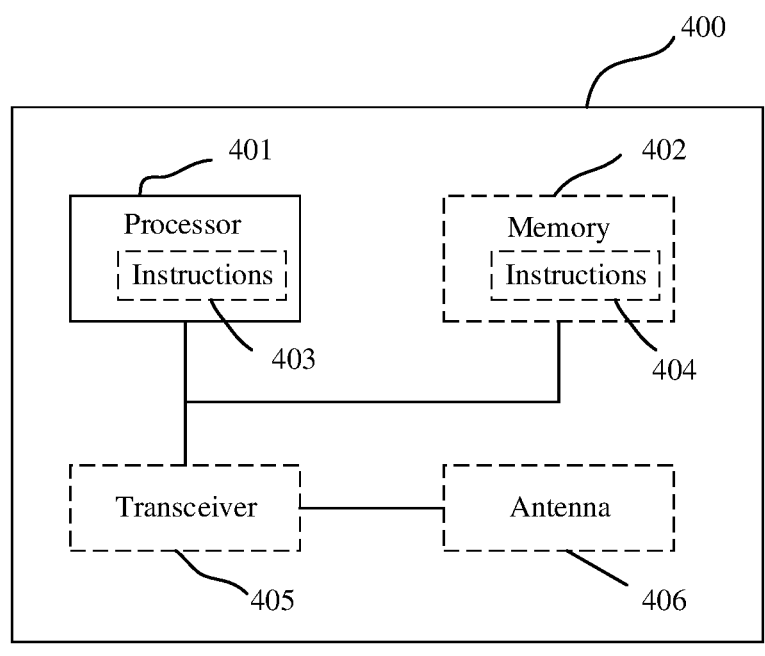
FIG. 4 is a schematic diagram of a structure of a communication apparatus according to an embodiment of this application.

FIG. 4 is a schematic diagram of a structure of an apparatus 400. The apparatus 400 may be a network device, a terminal, a server, or a centralized controller, or may be a chip, a chip system, a processor, or the like that supports the network device, the terminal, the server, or the centralized controller in implementing the foregoing method. The apparatus may be configured to implement the method described in the foregoing method embodiments. For details, refer to the descriptions in the foregoing method embodiments.

The apparatus 400 may include one or more processors 401. The processor 401 may also be referred to as a processing unit, and may implement a specific control function. The processor 401 may be a general-purpose processor, a dedicated processor, or the like. For example, the processor may be a baseband processor or a central processing unit. The baseband processor may be configured to process a communication protocol and communication data. The central processing unit may be configured to: control a communication apparatus (for example, a base station, a baseband chip, a terminal, a terminal chip, a DU, or a CU), execute a software program, and process data of the software program.

In an optional design, the processor 401 may alternatively store instructions and/or data 403, and the instructions and/or data 403 may be run by the processor, to enable the apparatus 400 to perform the method described in the foregoing method embodiments.

In another optional design, the processor 401 may include a transceiver unit configured to implement receiving and sending functions. For example, the transceiver unit may be a transceiver circuit, an interface, an interface circuit, or a communication interface. The transceiver circuit, the interface, or the interface circuit configured to implement the receiving and sending functions may be separated, or may be integrated together. The transceiver circuit, the interface, or the interface circuit may be configured to read and write code/data. Alternatively, the transceiver circuit, the interface, or the interface circuit may be configured to transmit or transfer a signal.

In another possible design, the apparatus 400 may include a circuit. The circuit may implement sending, receiving, or communication functions in the foregoing method embodiments.

Optionally, the apparatus 400 may include one or more memories 402. The memory may store instructions 404. The instructions may be run on the processor, to enable the apparatus 400 to perform the method described in the foregoing method embodiments. Optionally, the memory may further store data. Optionally, the processor may also store instructions and/or data. The processor and the memory may be separately disposed, or may be integrated together. For example, the correspondence described in the foregoing method embodiments may be stored in the memory or stored in the processor.

Optionally, the apparatus 400 may further include a transceiver 405 and/or an antenna 406. The processor 401 may be referred to as a processing unit, and control the apparatus 400. The transceiver 405 may be referred to as a transceiver unit, a transceiver machine, a transceiver circuit, a transceiver apparatus, a transceiver module, or the like, and is configured to implement sending and receiving functions.

Optionally, the apparatus 400 in this embodiment of this application may be configured to perform the method described in FIG. 2 or FIG. 3 in embodiments of this application.

The processor and the transceiver described in this application may be implemented in an integrated circuit (IC), an analog IC, a radio frequency integrated circuit RFIC, a mixed signal IC, an application-specific integrated circuit (ASIC), a printed circuit board (PCB), an electronic device, or the like. The processor and the transceiver may also be manufactured by using various IC technologies, for example, a complementary metal oxide semiconductor (CMOS), an N-type metal oxide semiconductor (NMOS), a positive channel metal oxide semiconductor (PMOS), a bipolar junction transistor (BJT), a bipolar CMOS (BiC-MOS), silicon germanium (SiGe), and gallium arsenide (GaAs).

The apparatus described in the foregoing embodiments may be the network device or the terminal. However, a range of the apparatus described in this application is not limited thereto, and the structure of the apparatus may not be limited to FIG. 4. The apparatus may be an independent device, or may be a part of a larger device. For example, the apparatus may be:

(1) an independent integrated circuit IC, a chip, or a chip system or subsystem;

(2) a set of one or more ICs, where optionally, the IC set may also include a storage component configured to store data and/or instructions;

(3) an ASIC, for example, a modem (MSM);

(4) a module that can be embedded in another device;

(5) a receiver, a terminal, an intelligent terminal, a cellular phone, a wireless device, a handheld device, a mobile unit, a vehicle-mounted device, a network device, a cloud device, an artificial intelligence device, a machine device, a home device, a medical device, an industrial device, or the like; or (6) others.

Figure 5:
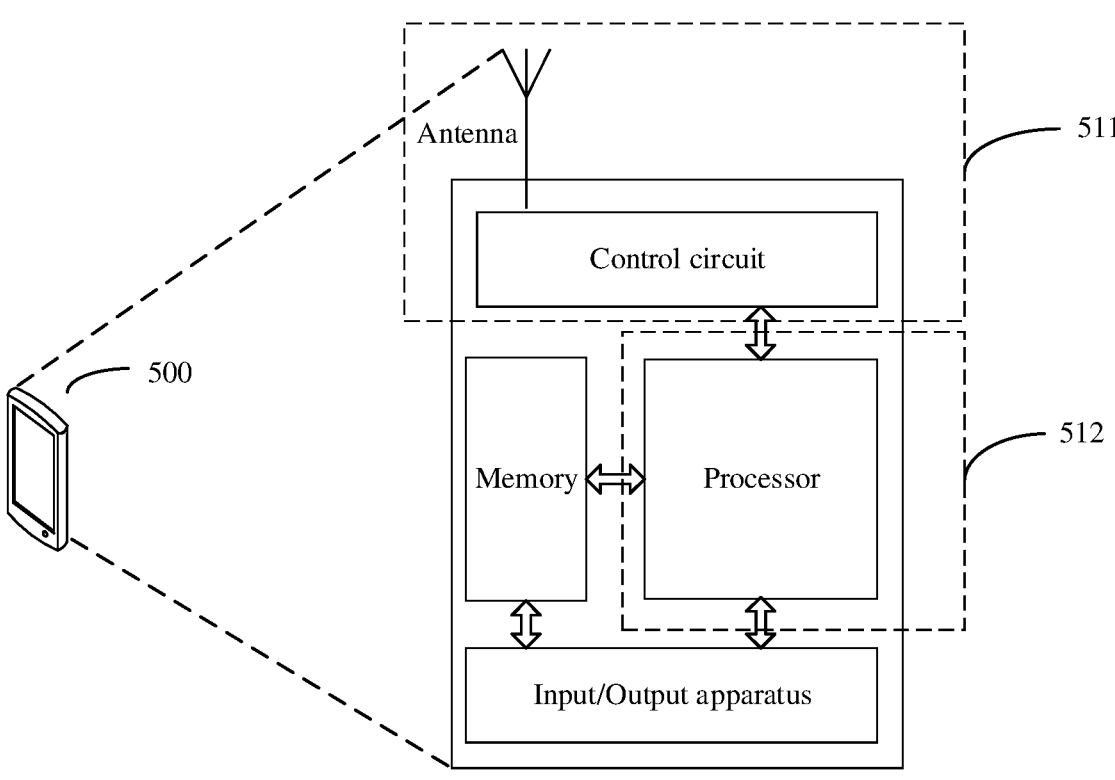
FIG. 5 is a schematic diagram of a structure of a terminal according to an embodiment of this application.

FIG. 5 is a schematic diagram of a structure of a terminal. The terminal is applicable to the scenario shown in FIG. 1. For ease of description, FIG. 5 shows only main components of the terminal. As shown in FIG. 5, the terminal 500 includes a processor, a memory, a control circuit, an antenna, and an input/output apparatus. The processor is mainly configured to process a communication protocol and communication data, control the entire terminal, execute a software program, and process data of the software program. The memory is mainly configured to store the software program and data. A radio frequency circuit is mainly configured to: perform conversion between a baseband signal and a radio frequency signal, and process the radio frequency signal. The antenna is mainly configured to receive and send a radio frequency signal in a form of an electromagnetic wave. The input/output apparatus, such as a touchscreen, a display, or a keyboard, is mainly configured to: receive data input by a user and output data to the user.

After the terminal is powered on, the processor may read a software program in a storage unit, interpret and execute instructions of the software program, and process the data of the software program. When data needs to be sent in a wireless manner, the processor performs baseband processing on the to-be-sent data, and outputs a baseband signal to the radio frequency circuit. The radio frequency circuit processes the baseband signal to obtain a radio frequency signal, and sends the radio frequency signal to the outside in a form of an electromagnetic wave through the antenna. When data is sent to the terminal, the radio frequency circuit receives the radio frequency signal through the antenna, further converts the radio frequency signal into a baseband signal, and outputs the baseband signal to the processor. The processor converts the baseband signal into data, and processes the data.

For ease of description, FIG. 5 shows only one memory and one processor. In a real terminal, there may be a plurality of processors and memories. The memory may also be referred to as a storage medium, a storage device, or the like. This is not limited in this embodiment of the present invention.

In an optional implementation, the processor may include a baseband processor and a central processing unit. The baseband processor is mainly configured to process the communication protocol and the communication data. The central processing unit is mainly configured to control the entire terminal, execute the software program, and process the data of the software program. The processor in FIG. 5 integrates functions of the baseband processor and the central processing unit. A person skilled in the art may understand that the baseband processor and the central processing unit may be individually independent processors, and are interconnected by using a technology such as a bus. A person skilled in the art may understand that the terminal may include a plurality of baseband processors to adapt to different network standards, and the terminal may include a plurality of central processing units to enhance a processing capability of the terminal. All the components of the terminal may be connected through various buses. The baseband processor may also be expressed as a baseband processing circuit or a baseband processing chip. The central processing unit may alternatively be expressed as a central processing circuit or a central processing chip. A function of processing the communication protocol and the communication data may be built in the processor, or may be stored in the storage unit in a form of a software program, and the processor executes the software program to implement a baseband processing function.

In an example, the antenna and the control circuit that have a sending/receiving function may be considered as a transceiver unit 511 of the terminal 500, and the processor having a processing function may be considered as a processing unit 512 of the terminal 500. As shown in FIG. 5, the terminal 50o includes the transceiver unit 511 and the processing unit 512. The transceiver unit may also be referred to as a transceiver, a transceiver machine, a transceiver apparatus, or the like. Optionally, a component that is in the transceiver unit 511 and that is configured to implement a receiving function may be considered as a receiving unit, and a component that is in the transceiver unit 511 and that is configured to implement a sending function may be considered as a sending unit. In other words, the transceiver unit 511 includes the receiving unit and the sending unit. For example, the receiving unit may also be referred to as a receiver, a receive machine, or a receiving circuit, and the sending unit may also be referred to as a transmitter, a transmit machine, or a transmitting circuit. Optionally, the receiving unit and the sending unit may be one integrated unit, or may be a plurality of independent units. The receiving unit and the sending unit may be located at one geographical position, or may be distributed at a plurality of geographical positions.

Figure 6:
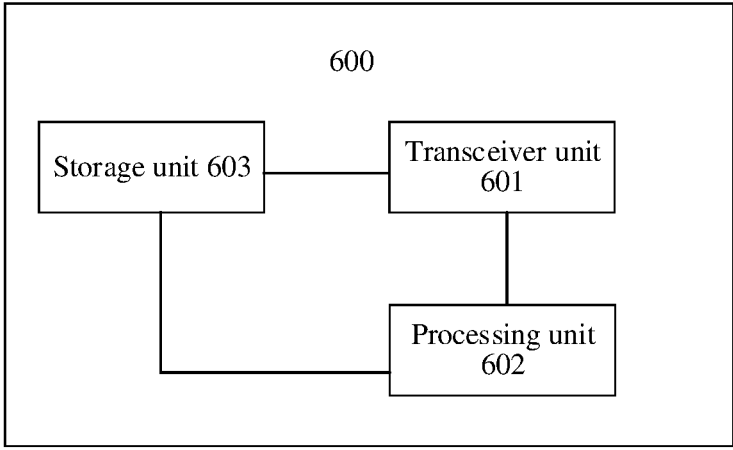
FIG. 6 is a schematic diagram of another communication apparatus according to an embodiment of this application.

As shown in FIG. 6, another embodiment of this application provides an apparatus 600. The apparatus may be a terminal or a network device, or may be a component (for example, an integrated circuit or a chip) of the terminal or the network device. Alternatively, the apparatus may be another communication module configured to implement the method in the method embodiments of this application. The apparatus 600 may include a processing module 602 (also referred to as a processing unit). Optionally, the apparatus may further include a transceiver module 601 (also referred to as a transceiver unit or a communication interface) and a storage module 603 (also referred to as a storage unit).

In a possible design, one or more modules in FIG. 6 may be implemented by one or more processors, or may be implemented by one or more processors and memories, or may be implemented by one or more processors and transceivers, or may be implemented by one or more processors, memories, and transceivers. This is not limited in embodiments of this application. The processor, the memory, and the transceiver may be disposed separately, or may be integrated.

The apparatus has a function of implementing the terminal described in embodiments of this application. For example, the apparatus includes a corresponding module, unit, or means used for the terminal to perform the steps that are related to the terminal and that are described in embodiments of this application. The function, the unit, or the means may be implemented by software or hardware, may be implemented by hardware by executing corresponding software, or may be implemented by a combination of software and hardware. Alternatively, the apparatus has a function of implementing the network device described in embodiments of this application. For example, the apparatus includes a corresponding module, unit, or means used for the network device to perform the steps that are related to the network device and that are described in embodiments of this application. The function, the unit, or the means may be implemented by software or hardware, may be implemented by hardware by executing corresponding software, or may be implemented by a combination of software and hardware. For details, refer to the corresponding descriptions in the foregoing corresponding method embodiment.

Optionally, modules in the apparatus 600 in this embodiment of this application may be configured to perform the method described in FIG. 2 or FIG. 3 in embodiments of this application. Specifically, in an embodiment, the transceiver unit 601 is configured to obtain a transmission pattern combination of data including at least two data packets, where the transmission pattern combination includes at least two transmission patterns, and the transmission pattern indicates a transmission manner and/or a processing manner of the data packet; and the processing unit 602 is further configured to transmit the data based on the transmission pattern combination, where the transmission pattern is determined for each data packet in correspondence to a matching condition, and the matching condition is associated with feature information of the data packet.

Optionally, the transceiver unit 601 is further configured to receive, from a first network device, first indication information indicating the transmission pattern combination. Optionally, the first indication indicates an index of each transmission pattern in the transmission pattern combination. Optionally, the first indication information further indicates the matching condition.

Optionally, the transceiver unit 601 is further configured to receive, from the first network device, indication information indicating the matching condition.

In a possible manner, the processing unit 602 is further configured to determine the transmission pattern for the data packet in correspondence to the matching condition. Optionally, the processing unit 602 is further configured to sequentially select the transmission patterns from the transmission combination in correspondence to a transmission sequence of the data packets.

Optionally, the transceiver unit 601 is further configured to receive, from the first network device, information indicating a reference data packet. Optionally, the processing unit 602 is further configured to sequentially select the transmission patterns from the transmission pattern combination for the data packets in correspondence to the reference data packet.

Optionally, the transceiver unit 601 is further configured to receive a quantity that is of consecutive data packets transmitted in each transmission pattern and that is indicated by the first network device.

Optionally, the transceiver unit 601 is further configured to receive, from the first network device, activation state information indicating the transmission pattern or second indication information indicating to update the transmission pattern combination. Optionally, the processing unit 602 is further configured to update an activation state of the transmission pattern or update the transmission pattern combination based on the second indication information.

Optionally, the transceiver unit 601 is further configured to send an update request message to the first network device, to request to update the transmission pattern combination. Optionally, the update request message includes a request reason, a recommended transmission pattern, and/or a recommended transmission parameter.

Optionally, the processing unit 602 is further configured to receive a default transmission pattern indicated by the network device.

Optionally, the processing unit 602 is further configured to transmit the data packet based on the transmission pattern combination. Optionally, the processing unit 602 is further configured to select, based on the matching condition, the transmission pattern corresponding to the data packet. Optionally, the processing unit 602 is further configured to transmit the data packet to the first network device or a second network device in the transmission pattern.

Optionally, the processing unit 602 is further configured to receive the data packet from the first network device or a second network device in the transmission pattern.

Specifically, in another embodiment, the transceiver unit 601 is configured to send first indication information to a terminal, where the first indication information indicates a transmission pattern combination of data including at least two data packets, the transmission pattern combination includes at least two transmission patterns, and the transmission pattern indicates a transmission manner and/or a processing manner of the data packet.

Optionally, the processing unit 602 is configured to transmit the data based on the transmission pattern combination, where the transmission pattern is determined for each data packet in correspondence to a matching condition, and the matching condition is associated with feature information of the data packet.

Optionally, the transceiver unit 601 is further configured to send, to the terminal, the first indication information indicating an index of each transmission pattern in the transmission pattern combination.

Optionally, the processing unit 602 is further configured to indicate the matching condition to the terminal. Optionally, the processing unit 602 is further configured to indicate the matching condition by using the first indication information.

Optionally, the processing unit 602 is further configured to indicate information about a reference data packet to the terminal.

Optionally, the transceiver unit 601 is further configured to send, to the terminal, activation state information indicating the transmission pattern or second indication information indicating to update the transmission pattern combination.

Optionally, the transceiver unit 601 is further configured to receive, from the terminal, an update request message requesting to configure or update the transmission pattern combination.

Optionally, the processing unit 602 is further configured to determine to update the transmission pattern combination based on the update request message. Optionally, the processing unit 602 is further configured to indicate the terminal to update the transmission pattern combination.

Optionally, the transceiver unit 601 is further configured to send third indication information to a second network device, where the third indication information indicates information associated with a to-be-transmitted data packet between the terminal and the second network device.

Optionally, the processing unit 602 is further configured to transmit the data packet based on the transmission pattern combination. Optionally, the processing unit 602 is further configured to receive the data packet from the terminal in the transmission pattern.

Optionally, the processing unit 602 is further configured to select, based on the matching condition, the transmission pattern corresponding to the data packet. Optionally, the processing unit 602 is further configured to transmit the data packet to the terminal in the transmission pattern.

Specifically, in another embodiment, the transceiver unit 601 is configured to receive third indication information from a first network device, where the third indication information indicates information associated with a to-be-transmitted data packet between a second network device and a terminal, a transmission pattern is determined for each data packet in correspondence to a matching condition, the transmission pattern indicates a transmission manner and/or a processing manner of the data packet, and the matching condition is associated with feature information of the data packet.

Optionally, the processing unit 602 is configured to transmit the data packet based on the third indication information.

Optionally, the processing unit 602 is further configured to perform, based on the third indication information, resource scheduling and/or configuration associated with transmission of the data packet.

A person of ordinary skill in the art may understand that, for the purpose of convenient and brief description, for a detailed working process of the foregoing system, apparatuses, and units, refer to a corresponding process in the foregoing method embodiments. Details are not described herein again.

It may be understood that, in some scenarios, some optional features in embodiments of this application may be independently implemented without depending on another feature, for example, a solution on which the optional features are currently based, to resolve a corresponding technical problem and achieve a corresponding effect. Alternatively, in some scenarios, the optional features may be combined with other features based on requirements. Correspondingly, the apparatus provided in embodiments of this application may also correspondingly implement these features or functions. Details are not described herein.

A person skilled in the art may further understand that various illustrative logical blocks (illustrative logical blocks) and steps that are listed in embodiments of this application may be implemented by electronic hardware, computer software, or a combination thereof. Whether the functions are implemented by using hardware or software depends on particular applications and a design requirement of the entire system. A person skilled in the art may use various methods to implement the functions for corresponding application, but it should not be considered that the implementation goes beyond the protection scope of embodiments of this application.

It may be understood that, the processor in embodiments of this application may be an integrated circuit chip, and has a signal processing capability. In an implementation process, steps in the foregoing method embodiments may be implemented by using a hardware integrated logical circuit in the processor, or by using instructions in a form of software. The foregoing processor may be a general purpose processor, a digital signal processor (digital signal processor, DSP), an application-specific integrated circuit (ASIC), a field programmable gate array (FPGA) or another programmable logic device, a discrete gate or a transistor logic device, or a discrete hardware component.

It may be understood that the memory in embodiments of this application may be a volatile memory or a nonvolatile memory, or may include a volatile memory and a nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), used as an external cache. By way of example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synchlink DRAM, SLDRAM), and a direct rambus dynamic random access memory (direct rambus RAM, DR RAM). It should be noted that the memory of the system and the method described in this specification includes but is not limited to these memories and any memory of another appropriate type.

This application further provides a computer-readable medium storing a computer program. When the computer program is executed by a computer, a function of any one of the foregoing method embodiments is implemented.

This application further provides a computer program product. When the computer program product is executed by a computer, a function of any one of the foregoing method embodiments is implemented.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer instructions are loaded and executed on the computer, the procedures or functions according to embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a high-density digital video disc (digital video disc, DVD)), a semiconductor medium (for example, a solid state disk (SSD)), or the like.

It may be understood that "an embodiment" mentioned in the entire specification means that particular features, structures, or characteristics related to the embodiment are included in at least one embodiment of this application. Therefore, embodiments in the entire specification do not necessarily refer to a same embodiment. In addition, these particular features, structures, or characteristics may be combined in one or more embodiments in any appropriate manner. It may be understood that sequence numbers of the foregoing processes do not mean an execution sequence in various embodiments of this application. The execution sequence of the processes should be determined based on functions and internal logic of the processes, and should not be construed as any limitation on the implementation processes of embodiments of this application. It should be understood that, in this application, "when" and "if" mean that an apparatus performs corresponding processing in an objective situation, and are not intended to limit time. The terms do not mean that the apparatus is required to have a determining action during implementation, and do not mean any other limitation.

It should be understood that in embodiments of this application, "B corresponding to A" represents that B is associated with A, or B may be determined based on A. However, it should be further understood that determining B based on A does not mean that B is determined based only on A. B may alternatively be determined based on A and/or other information.

"Predefine" in this application may be understood as "define", "predefine", "store", "pre-store", "pre-negotiate", "pre-configure", "solidify", or "pre-burn".

It may be understood that the system, the apparatus, and the method described in this application may alternatively be implemented in another manner. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located at one position, or may be distributed on a plurality of network units. Some or all of the units may be selected based on actual requirements to achieve the objectives of the solutions of embodiments.

In addition, functional units in embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

For same or similar parts in embodiments of this application, refer to each other. In embodiments of this application and the implementations/implementation methods in embodiments, unless otherwise specified or a logical conflict occurs, terms and/or descriptions are consistent and may be mutually referenced between different embodiments and between the implementations/implementation methods in embodiments. Technical features in the different embodiments and the implementations/implementation methods in embodiments may be combined to form a new embodiment, implementation, or implementation method based on an internal logical relationship thereof. The foregoing descriptions are implementations of this application, but are not intended to limit the protection scope of this application.

The foregoing descriptions are merely specific implementations of this application, but are not intended to limit the protection scope of this application. Any variation or replacement readily figured out by a person skilled in the art within the technical scope disclosed in this application shall fall within the protection scope of this application.

What is claimed is:

1. A method, the method comprising:

receiving first indication information indicating a transmission pattern combination of data, wherein the data comprises at least two data packets, the transmission pattern combination comprises at least two transmission patterns, and each transmission pattern of the at least two transmission patterns indicates a transmission manner of a corresponding data packet of the at least two data packets and/or a processing manner of the corresponding data packet;

receiving information indicating a reference data packet, wherein the transmission pattern is determined for the corresponding data packet in correspondence to a matching condition associated with feature information of the corresponding data packet, and the at least two transmission patterns are sequentially selected from the transmission pattern combination in correspondence to a transmission sequence of the at least two data packets and the reference data packet; and transmitting the data based on the transmission pattern combination.

2. The method according to claim 1, wherein the first indication information is received from a first network device.

3. The method according to claim 2, wherein the first indication information further indicates the matching condition.

4. The method according to claim 2, wherein the transmission pattern comprises a transmission parameter and a matching condition parameter, and the matching condition parameter indicates the matching condition.

5. The method according to claim 1, wherein the method further comprises:

receiving, from a first network device, second indication information indicating the matching condition.

6. The method according to claim 1, wherein the feature information of the corresponding data packet comprises at least one of the following: data packet size information, data packet type information, quality of service (QoS) parameter information corresponding to the corresponding data packet, importance level information corresponding to the corresponding data packet, or transmission sequence information of the corresponding data packet.

7. The method according to claim 1, wherein the transmission pattern comprises a transmission parameter, the transmission parameter indicates the transmission manner and/or the processing manner of the corresponding data packet, and the transmission manner and/or the processing manner comprise/comprises transmission resource information, transmission path information, and/or reliability processing manner information.

8. The method according to claim 1, wherein the transmission pattern comprises a transmission parameter, and the transmission parameter comprises at least one parameter of logical channel (LCH) information, duplication state information, information indicating a quantity of consecutive data packets transmitted in the transmission pattern, logical channel prioritization (LCP) information, data radio bearer (DRB) information, or shared spectrum information.

9. The method according to claim 1, wherein the information indicating the reference data packet comprises a sequence number of a packet data convergence protocol (PDCP) service data unit (SDU) corresponding to the reference data packet.

10. A method, comprising:

sending first indication information to a terminal, wherein the first indication information indicates a transmission pattern combination of data, the data comprises at least two data packets, the transmission pattern combination comprises at least two transmission patterns, and each transmission pattern of the at least two transmission patterns indicates a transmission manner of a corresponding data packet of the at least two data packets and/or a processing manner of the corresponding data packet;

determining the transmission pattern for the corresponding data packet in correspondence to a matching condition associated with feature information of the corresponding data packet, wherein the determining the transmission pattern comprises sequentially selecting the at least two transmission patterns from the transmission pattern combination in correspondence to a transmission sequence of the at least two data packets, and the sequentially selecting the at least two transmission patterns comprises indicating information about a reference data packet to the terminal and sequentially selecting the at least two transmission patterns from the transmission pattern combination in correspondence to the reference data packet; and receiving the data based on the transmission pattern combination.

11. The method according to claim 10, further comprising:

indicating the matching condition to the terminal.

12. The method according to claim 10, wherein the feature information of the corresponding data packet comprises at least one of the following: data packet size information, data packet type information, quality of service (QoS) parameter information corresponding to the corresponding data packet, importance level information corresponding to the corresponding data packet, or transmission sequence information of the corresponding data packet.

13. The method according to claim 10, wherein the transmission pattern comprises a transmission parameter, the transmission parameter indicates the transmission manner and/or the processing manner of the corresponding data packet, and the transmission manner and/or the processing manner comprise/comprises transmission resource information, transmission path information, and/or reliability processing manner information.

14. The method according to claim 10, wherein the transmission pattern comprises a transmission parameter, and the transmission parameter comprises at least one parameter of logical channel (LCH) information, duplication state information, information indicating a quantity of consecutive data packets transmitted in a first transmission pattern, logical channel prioritization (LCP) information, data radio bearer (DRB) information, or shared spectrum information.

15. The method according to claim 10, further comprising receiving, from the terminal, an update request message requesting to configure or update the transmission pattern combination; and configuring or updating the transmission pattern combination based on the update request message.

16. The method according to claim 15, wherein the update request message comprises one or more of a request reason, a recommended transmission pattern, or a recommended transmission parameter.

17. The method according to claim 10, wherein the information indicating the reference data packet comprises a sequence number of a packet data convergence protocol (PDCP) service data unit (SDU) corresponding to the reference data packet.

18. A method, comprising:

receiving indication information from a first network device, wherein the indication information indicates information associated with to-be-transmitted data between a second network device and a terminal, the information associated with the to-be-transmitted data comprises a transmission pattern combination of the to-be-transmitted data, the to-be-transmitted data comprises at least two data packets, the transmission pattern combination comprises at least two transmission patterns, and each transmission pattern of the at least two transmission patterns indicates a transmission manner and/or a processing manner of the corresponding data packet;

receiving information indicating a reference data packet, wherein the transmission pattern is determined for the corresponding data packet in correspondence to a matching condition associated with feature information of the corresponding data packet, and the at least two transmission patterns are sequentially selected from the transmission pattern combination in correspondence to a transmission sequence of the at least two data packets and the reference data packet; and transmitting the at least two data packets based on the indication information.

19. The method according to claim 18, wherein the information associated with the to-be-transmitted data comprises at least one of the following: bitmap information of the corresponding data packet, transmission pattern information used by the corresponding data packet, transmission parameter information used by the corresponding data packet, or arrival time and/or period information of the corresponding data packet.

20. The method according to claim 18, wherein the transmitting the at least two data packets based on the indication information comprises:

performing, based on the indication information, resource scheduling and/or configuration associated with transmission of the at least two data packets.

* * * * *